(12) United States Patent
Hagenbuch

(10) Patent No.: US 6,547,091 B2
(45) Date of Patent: Apr. 15, 2003

(54) BAFFLED TANK FOR A VEHICLE

(76) Inventor: LeRoy G. Hagenbuch, 502 W. Northgate Rd., Peoria, IL (US) 61614

( * ) Notice: Subject to any disclaimer, the term of this patent is extended or adjusted under 35 U.S.C. 154(b) by 0 days.

(21) Appl. No.: 09/873,032

(22) Filed: Jun. 1, 2001

(65) Prior Publication Data

US 2002/0179611 A1 Dec. 5, 2002

(51) Int. Cl.[7] ................................................ B65D 25/00
(52) U.S. Cl. ...................... 220/563; 220/4.12; 220/564; 137/576
(58) Field of Search ................................. 220/563, 564, 220/4.12; 137/5.74, 576

(56) References Cited

U.S. PATENT DOCUMENTS

| | | | | |
|---|---|---|---|---|
| 2,992,656 A | * | 7/1961 | Elliott et al. ................. | 137/576 |
| 3,131,949 A | * | 5/1964 | Black ...................... | 220/564 X |
| 3,166,212 A | * | 1/1965 | Resos ...................... | 220/4.12 X |
| 3,979,005 A | * | 9/1976 | Robinson et al. ........ | 220/563 X |
| 4,182,254 A | * | 1/1980 | Secord et al. ............ | 220/564 X |
| 4,775,070 A | * | 10/1988 | Williams ...................... | 220/563 |

* cited by examiner

Primary Examiner—Steven Pollard
(74) Attorney, Agent, or Firm—Leydig, Voit & Mayer, Ltd.

(57) ABSTRACT

A tank for transporting liquids is provided. The tank includes a tank vessel having front and rear walls defining a longitudinal direction, opposing sidewalls defining a lateral direction and a floor and a top. An X-shaped baffle arrangement extends through the interior of the tank vessel in the longitudinal direction. The X-shaped baffle arrangement has a longitudinally extending chamber in the center thereof, two upper legs extending between the chamber and the top of the tank vessel and two lower legs extending between the chamber and the floor of the tank vessel. A plurality of longitudinally spaced pivotal baffles extending from either side of X-shaped baffle arrangement towards a respective one of the sidewalls. Each pivotal baffle being supported for pivotal movement on the X-shaped baffle arrangement between an open position wherein the pivotal baffle extends in the longitudinal direction and a closed position wherein the pivotal baffle extends in the lateral direction. A plurality of entry hatches can be provided in the tank vessel for permitting access into the interior of the tank vessel. Each entry hatch has a removable hatch plate and is sized to allow a person to enter the tank therethrough.

67 Claims, 20 Drawing Sheets

BAFFLED TANK FOR A VEHICLE

FIELD OF THE INVENTION

This invention pertains to tanks for storing and dispensing fluids, and in particular, to such tanks which are mounted on vehicles.

BACKGROUND OF THE INVENTION

Dust control can be a particular problem on construction sites, building demolition sites, excavation sites and mine sites. For example, in a mining operation, the mine haul roads essentially consist of dirt and gravel. Dust control is necessary on the haul roads so that the operators of the mine vehicles can readily see the other mine vehicles using the roads. Thus, dust control on the haul roads is a safety issue. Moreover, dust clouds caused by vehicles operating on the haul roads can adversely impact air quality potentially creating environmental issues particularly where the dust clouds drift beyond the mine site.

Typically, mines have water tanker trucks, which are used to water down the haul roads in order to control dust. Such water tanker trucks generally have a plurality of spray nozzles positioned on either the forward or rearward sections of the vehicles to dispense a fluid spray or mist onto the ground. The water tanker truck can also have hoses or a water monitor/cannon for washing down other mining equipment and, in some cases, fire control.

Because of the service demands on such water tanker trucks, they are typically capable of carrying very large quantities of water. For example, water tanker trucks used in mining operations can have fluid capacities of over 50,000 gallons. Of course, vehicle stability is a critical issue when transporting large volumes of water that, in the case of a 50,000 gallon tank, can carry a water load of over 200 tons. Specifically, surging and wave motion of the fluid, particularly transverse surging resulting from centrifugal forces experienced during turning of the truck can cause a tanker truck to become unstable or even to overturn. To prevent such surging of the fluid, the tank is provided with internal baffles.

To ensure a long-life, the interior of the tanks must undergo periodic maintenance. For example, to protect against corrosion, the interior surfaces of the tank may need to be periodically sandblasted and re-coated with a rust protection coating such as an epoxy. This work is complicated by the fact that the tanks only have points of entry on the top of the tank and often just a single point of entry, and thus the work is subject to confined space safety regulations. Accordingly, workers performing tasks inside the tank must be provided with secondary air sources from outside the tank. This can greatly complicate the maintenance operations. Moreover, it can be difficult for the workers to maneuver around the internal tank baffles particularly since the interior of the tank is very dark. Accordingly, maintaining the interior of these tanks can be a difficult and time-consuming process.

Another problem with these types of tanks is that at larger sizes they can be difficult to ship to the location at which they are installed onto the vehicle, typically an off-highway truck. For instance, the largest tanks can be over twenty feet wide. As can be appreciated, transporting a tank of that size can be a difficult and expensive operation.

OBJECTS OF THE INVENTION

Accordingly, in view of the foregoing, a general object of the present invention is to provide an improved baffled tank for a tanker truck such as used for dust control in mining operations, construction sites and the like.

A more specific object of one embodiment of the present invention is to provide a tank for such a tanker truck which has an improved baffling system.

Another object of one embodiment of the present invention is to provide a baffled tank for such a tanker truck which is configured so work inside the tank can be performed much more easily.

DETAILED DESCRIPTION OF THE INVENTION

Figure 1:
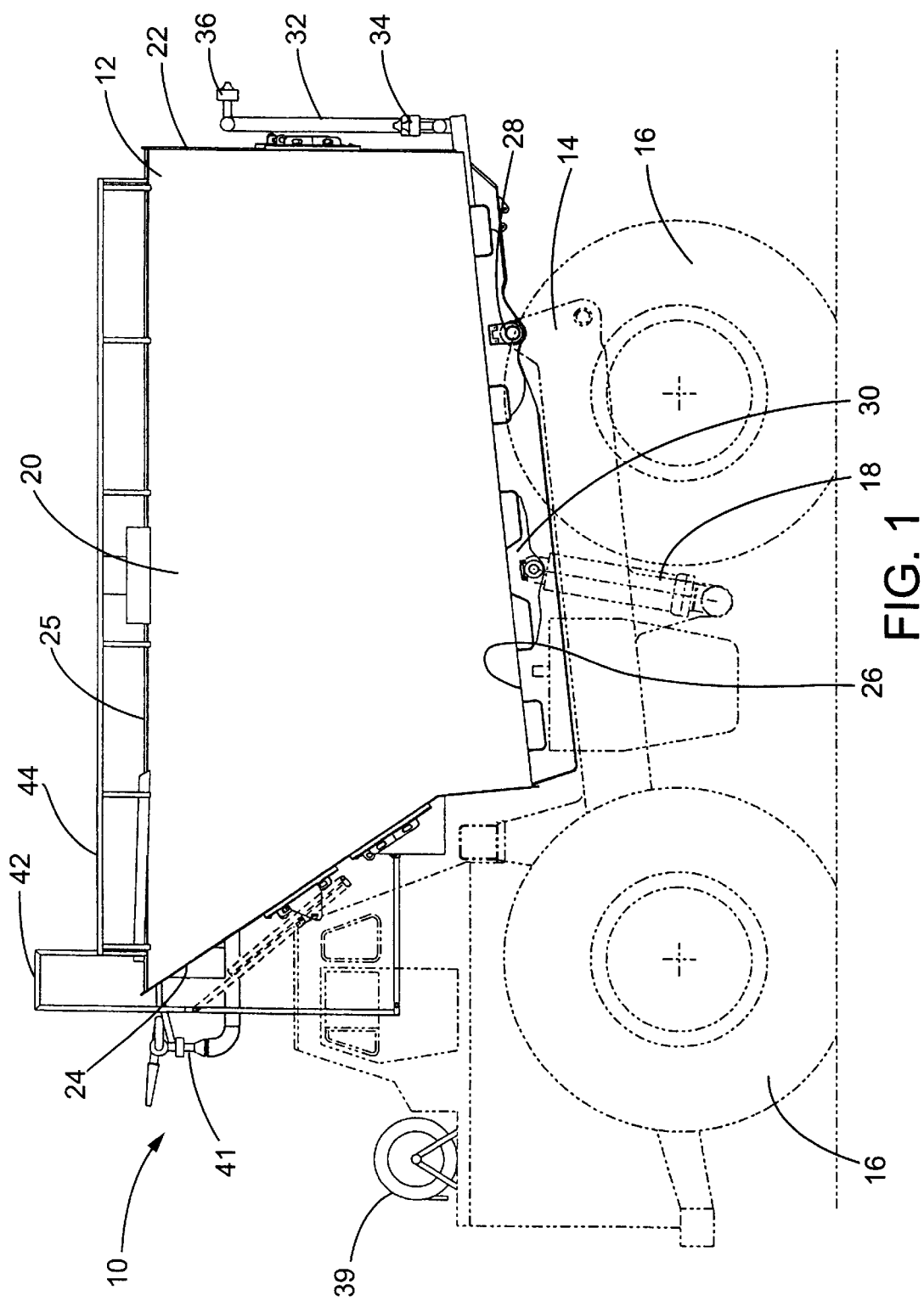
FIG. 1 is a side elevation view of an illustrative tank constructed in accordance with the present invention mounted on the chassis of an off-highway tanker truck.
Figure 2:
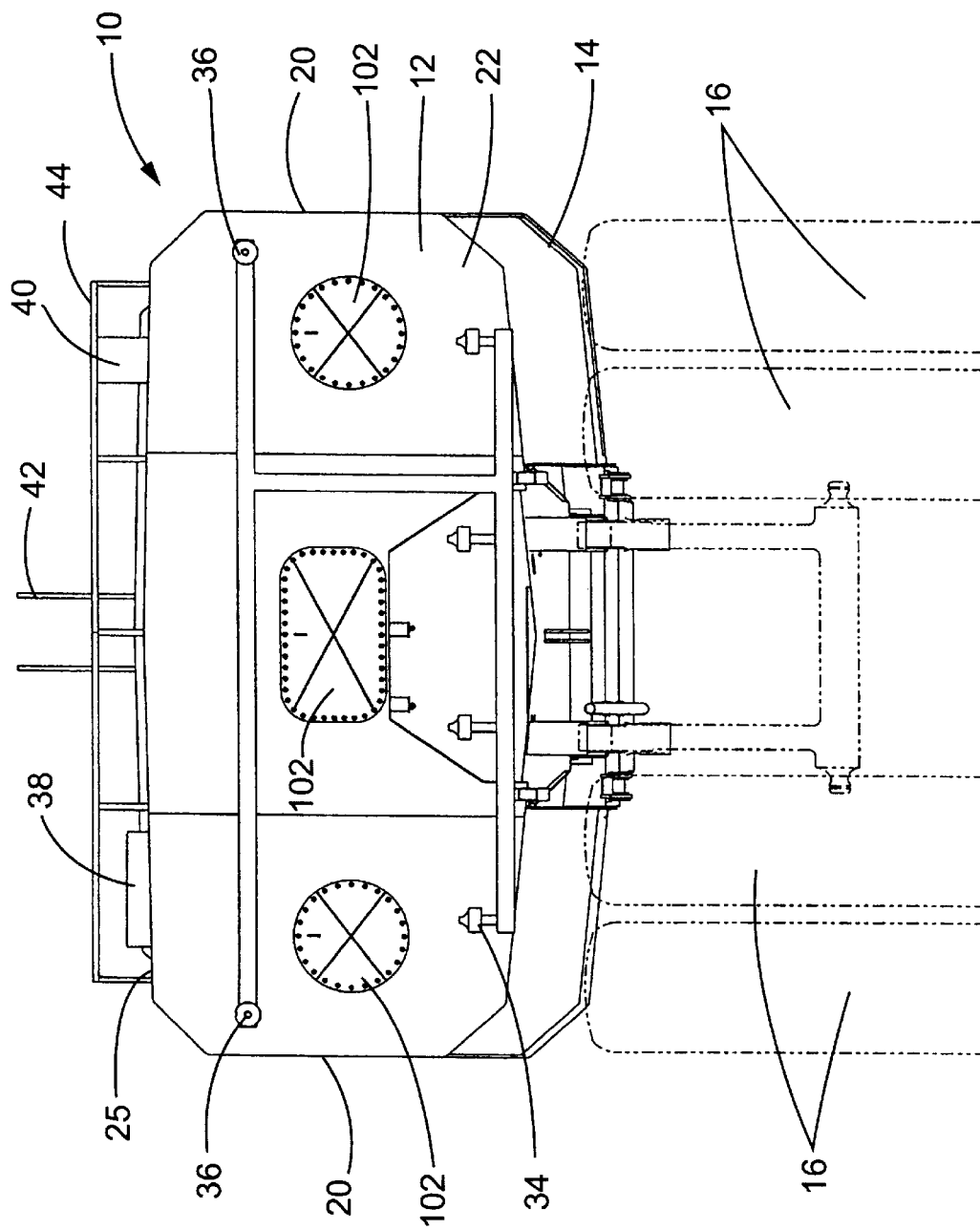
FIG. 2 is an end elevation view of the tank of FIG. 1 mounted on the chassis of an off-highway tanker truck.

Referring now more particularly to FIGS. 1 and 2 of the drawings, there is shown an exemplary off-highway tanker truck 10 having a baffled tank 12 constructed in accordance with the present invention. The tanker truck 10 includes a chassis 14 which is supported on a plurality of tires 16 and on which the tank 12 is mounted. While the tank 12 of the present invention is described in the context of an off-highway tanker truck, those skilled in the art will appreciate that the teachings of the present invention are equally applicable to relatively large tanks mounted on other types of vehicles such as, for example, on-highway trucks, trailers, off-highway earth-moving scrapers and airplanes.

Optionally, as in the illustrated embodiment, the tank 12 can be attached to the chassis 14 for pivotal movement into a raised position so as to allow access to components on the tanker truck 10 such as the drive train, transmission, or gear differential. The tank 12 can be moved between the raised and lowered positions by actuation of a lift cylinder 18 carried on the chassis 14 of the tanker truck 10. As will be appreciated, the tank 12 can also be rigidly mounted on the chassis 14.

The tank 12 consists of a pair of opposing sidewalls 20, a rear wall 22, a front wall 24, a top wall 25 and a floor 26. In this case, the floor 26 includes the components for mounting the tank to the chassis including the tank/chassis pivots 28 and the mounts 30 for the lift cylinder 18 (see, e.g., FIGS. 1 and 7). In the illustrated embodiment, as shown in FIG. 1, the floor 26 angles downward as it extends from the rear wall 22 to the front wall 24. Additionally, the front wall 24 includes a portion which is angled away from the rear wall 22 of the tank 12. It will be appreciated that the walls of the tank 12 can have any shape including curved.

For discharging fluid, the tank 12 includes, in this case, a plurality of spray nozzles which are supplied by a spray bar assembly 32 arranged on the exterior of the rear wall 22 of the tank 12 and in communication with a fluid pump mounted on the rear of the tank. As shown in FIG. 2, the illustrated embodiment includes four lower nozzles 34 spaced across the width of the tank 12 for producing a horizontal flat spray to the rear of the tanker truck 10. The tank 12 also includes two upper nozzles 36 which are arranged to provide a vertical spray to the sides of the tanker truck 10. Of course, the spray nozzles can be arranged in various other locations on the tank 12 including on the sides and the front. Additionally, as desired, the tank 12 can be provided with one or more hose reels 39 and manually or remote-controlled monitors 41 for distributing fluid onto other equipment, material piles and other hard to reach areas as shown in FIG. 1. The hose reels and monitors could also be used for fighting fires. A pump can be provided to disburse the fluid into the spray bar assembly 32 and thereby into the various nozzles. It will be appreciated that the tank 12 of the present invention is not limited to any particular method or arrangement for discharging the fluid.

In a conventional manner, the top wall 25 of the tank 12 includes a fill hole 38, as shown FIG. 2, through which the tank can be filled. Additionally, a ventilation tube 40 is provided through the top wall 25 of the tank 12 to facilitate the filling process. The tank 12 can also be provided with a water level gauge such as for example a sight gauge. To permit an operator to have access to what is typically the active work area on the top of the tank 12, for example to assist in the filling operation, the tank 12 can optionally include a ladder 42 and a guard rail 44 which goes around the outer edges of the top wall 25 of the tank 12 such as shown in FIG. 1.

In accordance with an important aspect of one embodiment of the present invention, the tank 12 includes a novel baffle system in which the structural components of the tank also serve as baffles. Moreover, as described in detail below, the baffle system can also be configured to make the interior of the tank 12 much more accessible to workers than baffled tanks that are presently available. The baffle system is best described by separating the tank into a center section 46 shown in FIGS. 7–10 and left and right side sections 48, 50 shown in FIGS. 11–14 and 15–18, respectively, that are symmetrical with each other. Though, as can be appreciated, relatively smaller tanks could be produced in a single section. The entire baffle system is shown assembled together in FIGS. 3–6. Left and right are used herein with reference to looking forward from the rear of tanker truck 10 of FIG. 1 towards the front.

In order to allow the tank 12 to be shipped more easily to a location where it is assembled to an off-highway truck, the center, left and right side sections 46, 48, 50 can comprise separate components that are assembled together. In particular, as shown in the exploded view of FIG. 21, the left and right side sections 48, 50 can be connected to either side of the center section 46 via welding or any other appropriate method to form the tank 12. The three-piece construction allows the tank 12 to be broken into relatively smaller components for shipment. Of course, other aspects of the present invention, such as the baffle arrangement described below, are not limited to tanks having a three-piece construction, rather they can be incorporated into single-piece tanks or tanks consisting of any number of components.

Figure 3:
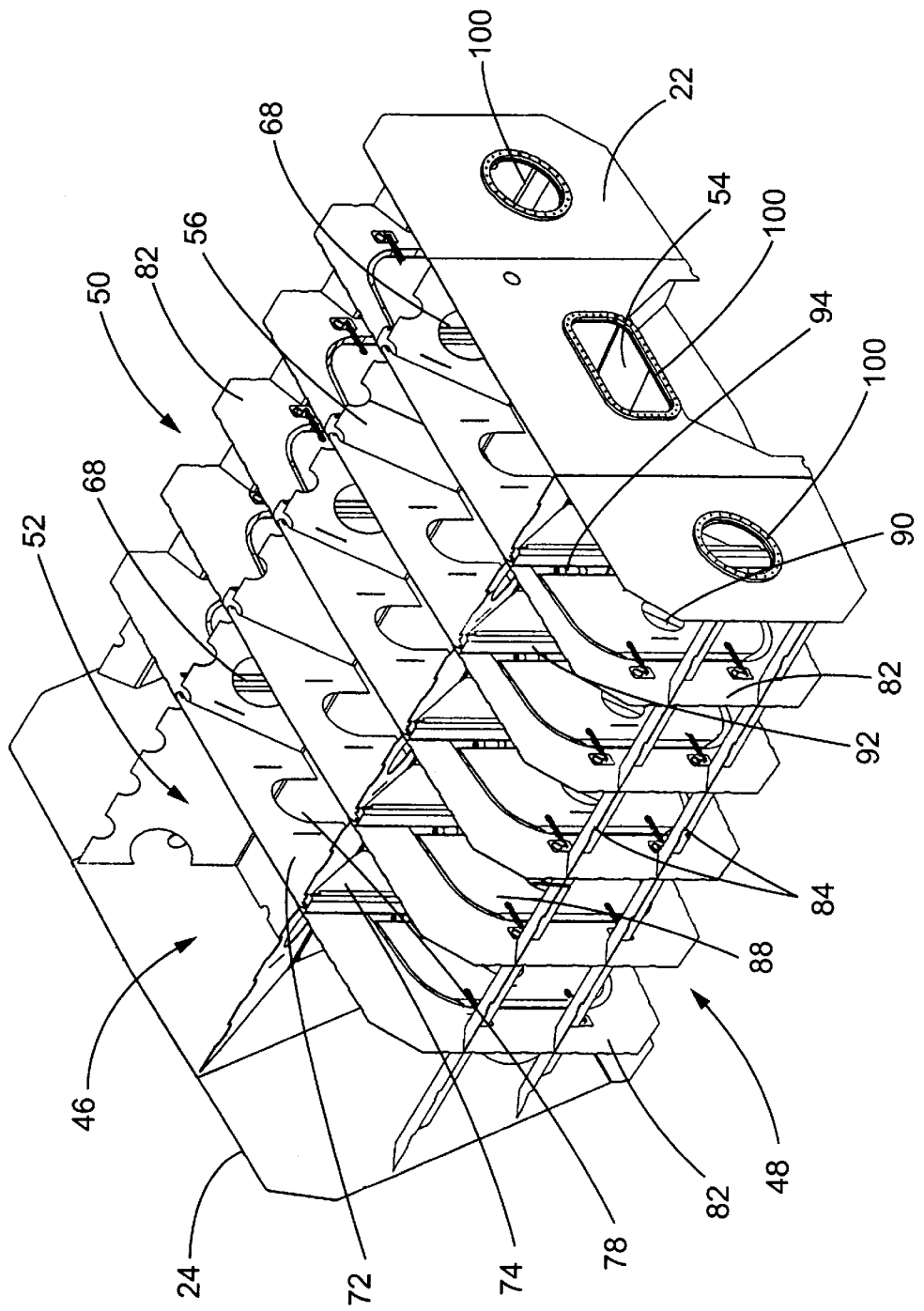
FIG. 3 is a perspective view of the tank of FIG. 1 showing the assembled internal baffle system.
Figure 4:
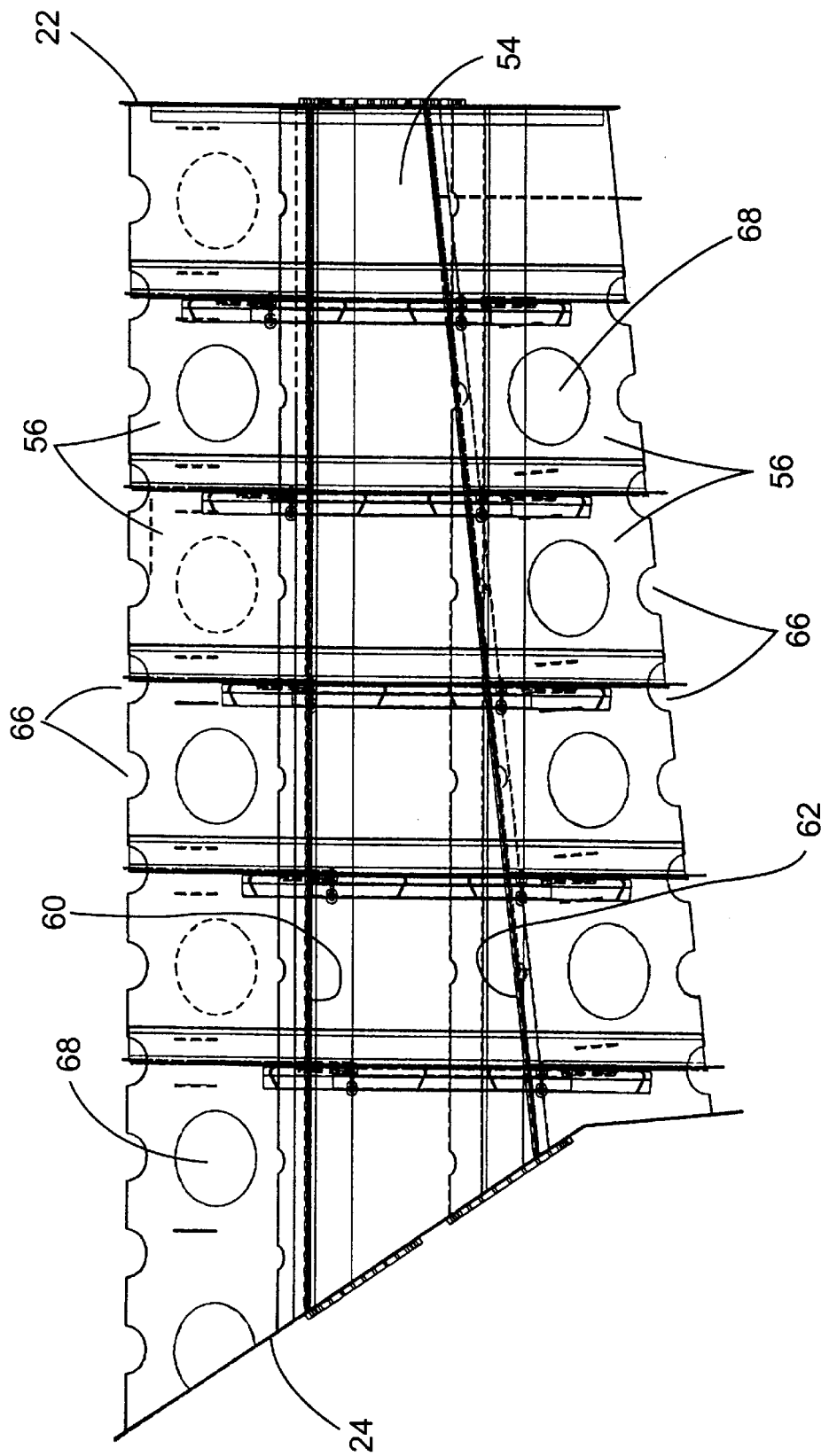
FIG. 4 is a side elevation view of the tank of FIG. 1 showing the assembled internal baffle system.
Figure 6:
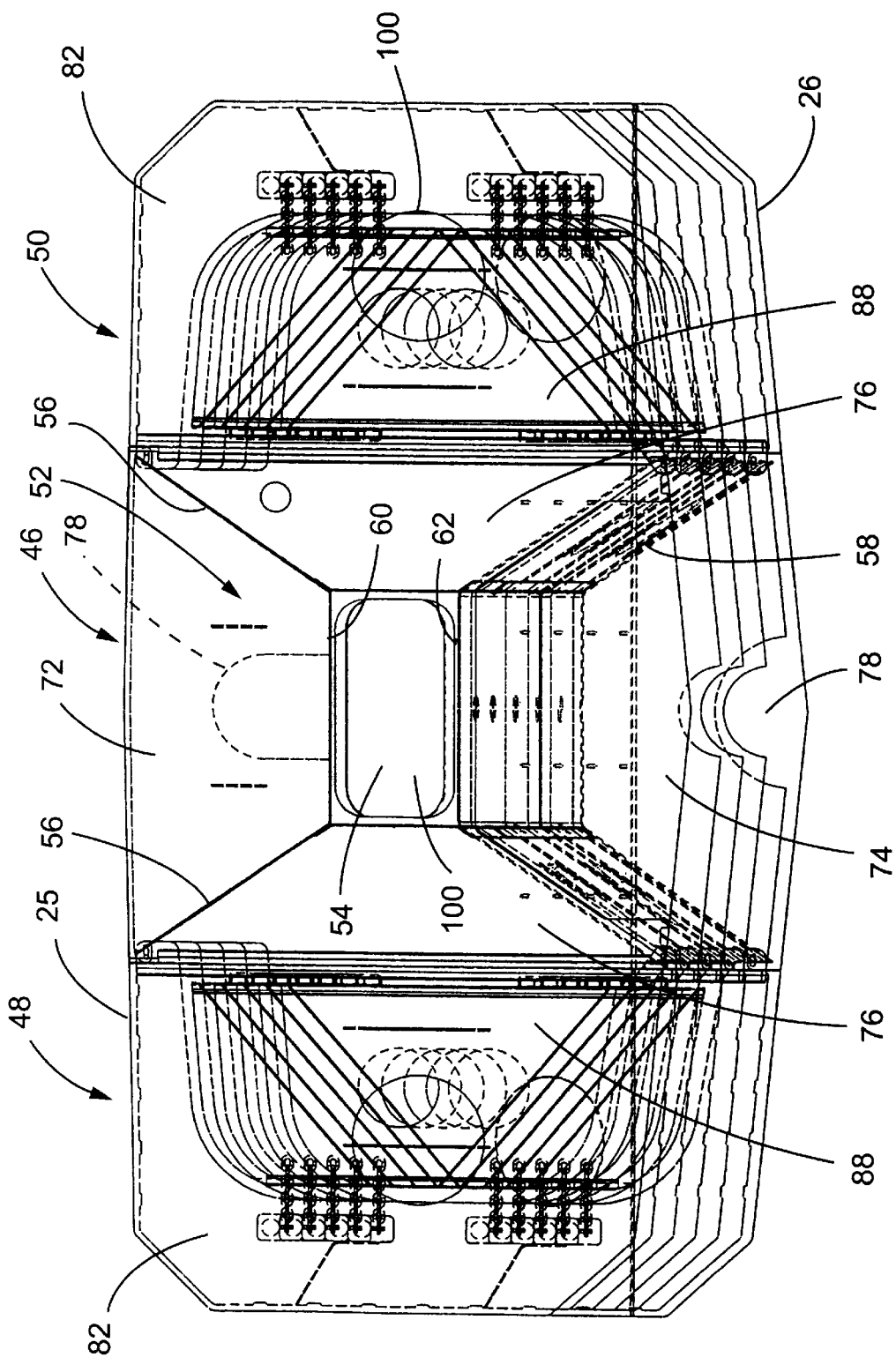
FIG. 6 is a rear elevation view of the assembled internal baffle system of the tank of FIG. 1.
Figure 7:
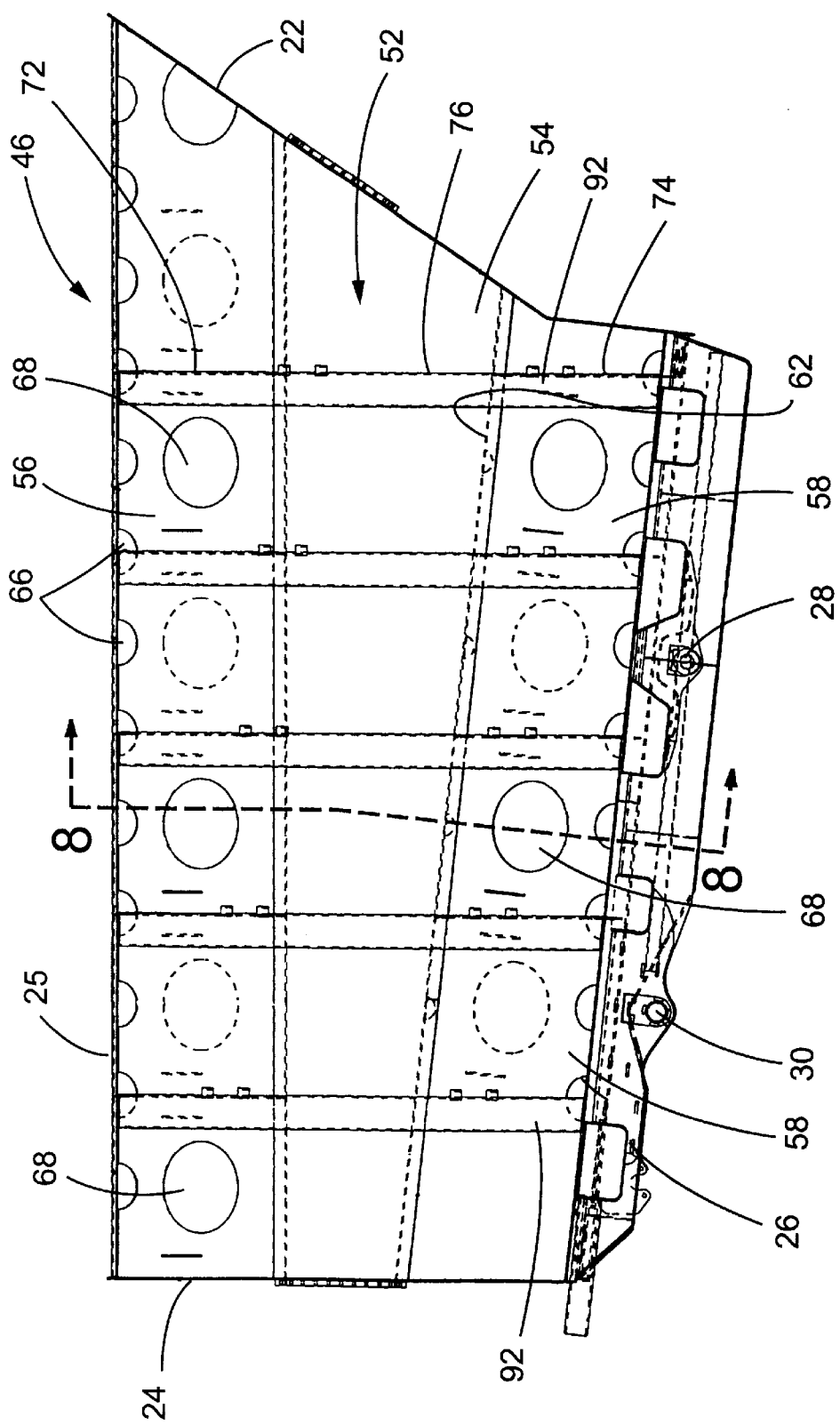
FIG. 7 is a side elevation view of the center section of the tank of FIG. 1.
Figure 8:
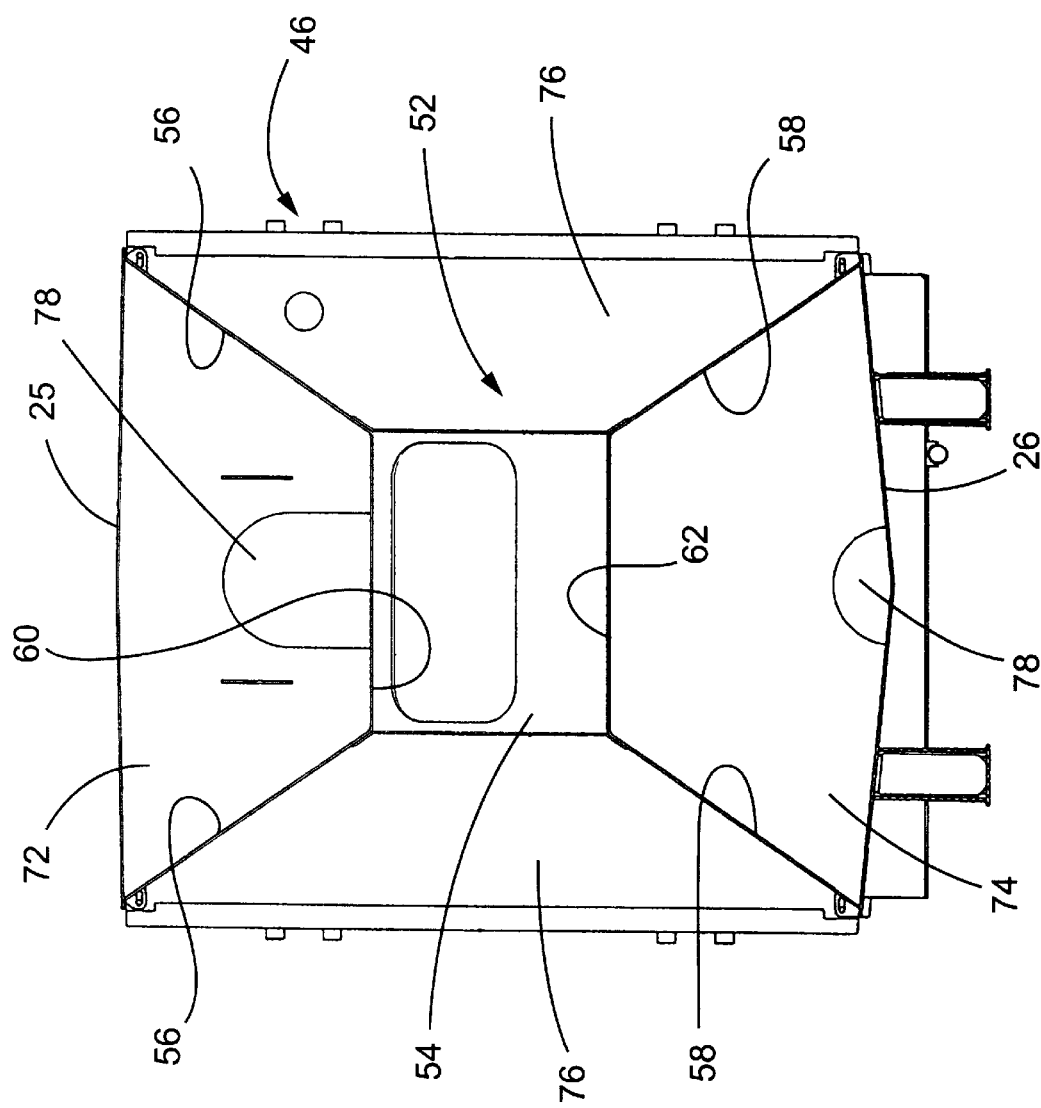
FIG. 8 is a sectional view of the center section of the tank of FIG. 1 taken in the plane of line 8—8 in FIG. 7.
Figure 9:
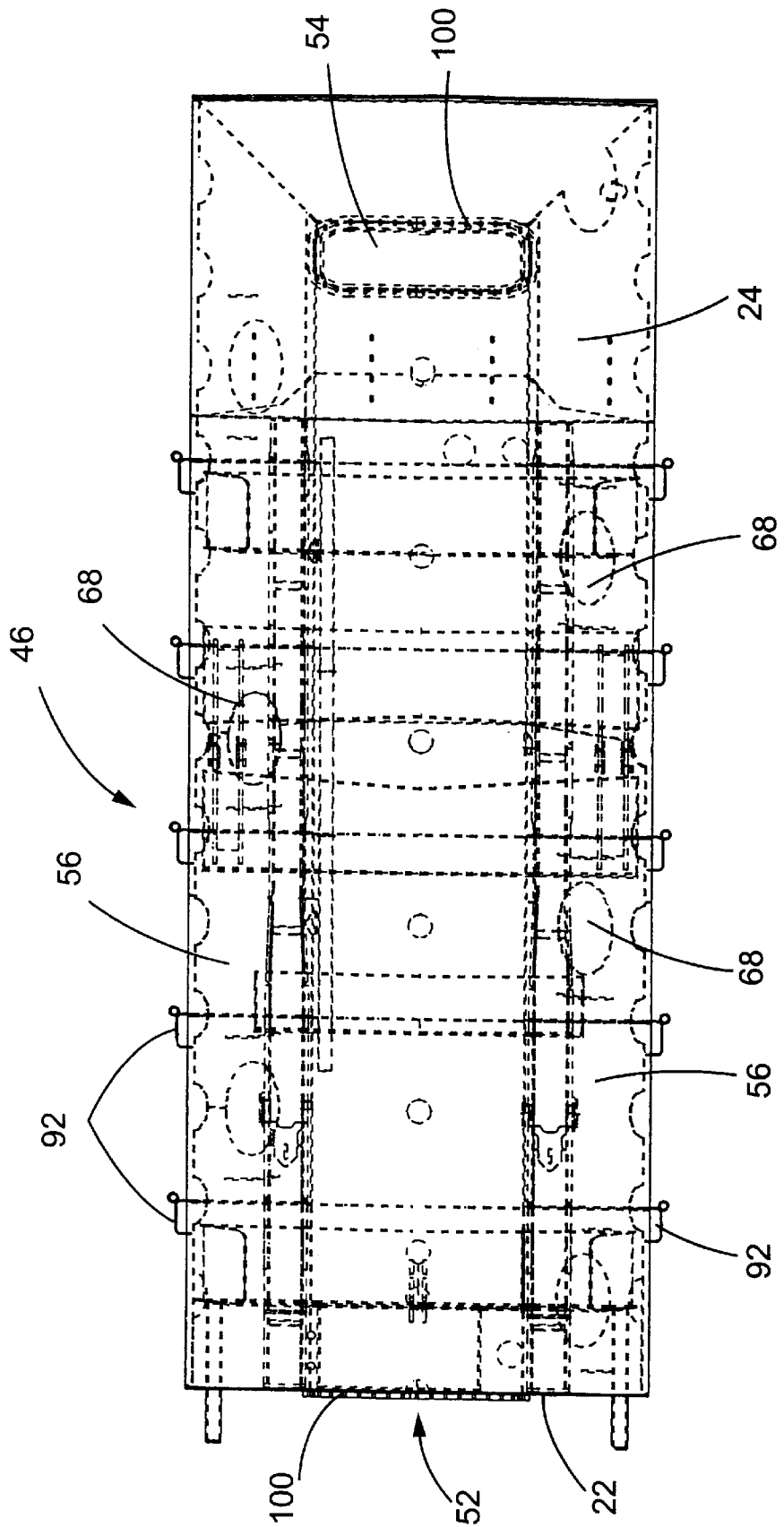
FIG. 9 is a top plan view of the center section of the tank of FIG. 1.
Figure 10:
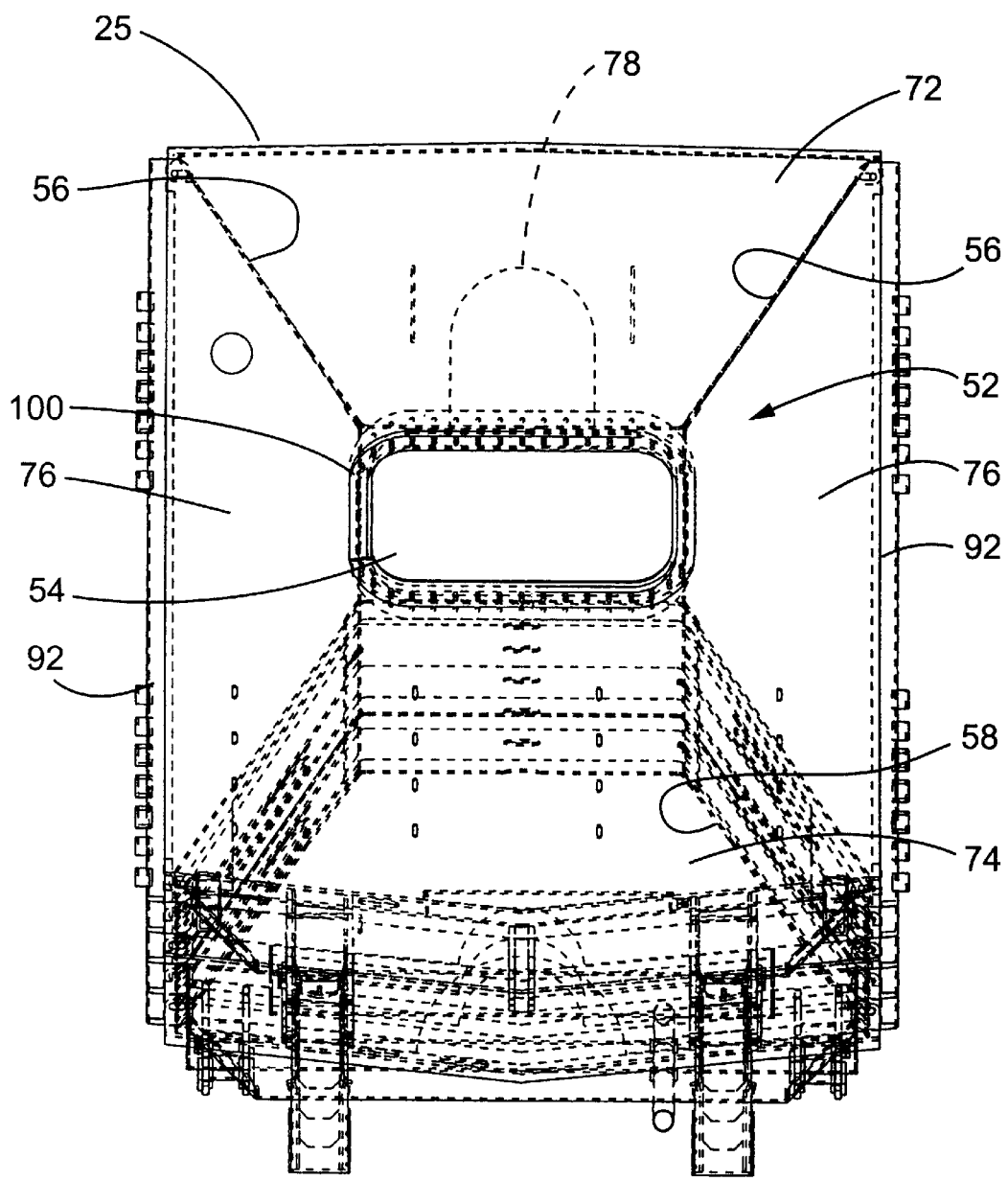
FIG. 10 is a front elevation view of the center section of the tank of FIG. 1.

To suppress wave motion and surging of the fluid in the lateral or side-to-side direction, the center section 46 has longitudinal baffles that generally form an X-shaped arrangement 52. Advantageously, this X-shaped baffle arrangement 52 also provides the structural supports for the top wall and floor of the tank. As shown in FIGS. 3, 6, and 10, the X-shaped arrangement 52 extends vertically between the top wall 25 and floor 26 of the tank 12 and has a rectangular shaped chamber 54 arranged in its center. In particular, as best shown in FIG. 8, upper legs 56 of the X-shaped arrangement 52 extend between an upper surface 60 of the chamber 54 and the top wall 25 of the tank and lower legs 58 of the X-shaped arrangement extend between a lower surface 62 of the chamber and the floor 26 of the tank. The rectangular chamber 54 and the upper and lower legs 56, 58 of the X-arrangement 52 extend longitudinally through the center section 46 between the front 24 and rear 22 walls of the tank 12 as shown in FIGS. 7 and 9. The rectangular chamber 54, in this case, gets gradually larger as it extends from the rear end of the center section 46 towards the front end because the lower wall 62 of the chamber 54 angles downward parallel in relation to the truck chassis 14 and the tank floor 26 as shown in FIG. 7.

Figure 5:
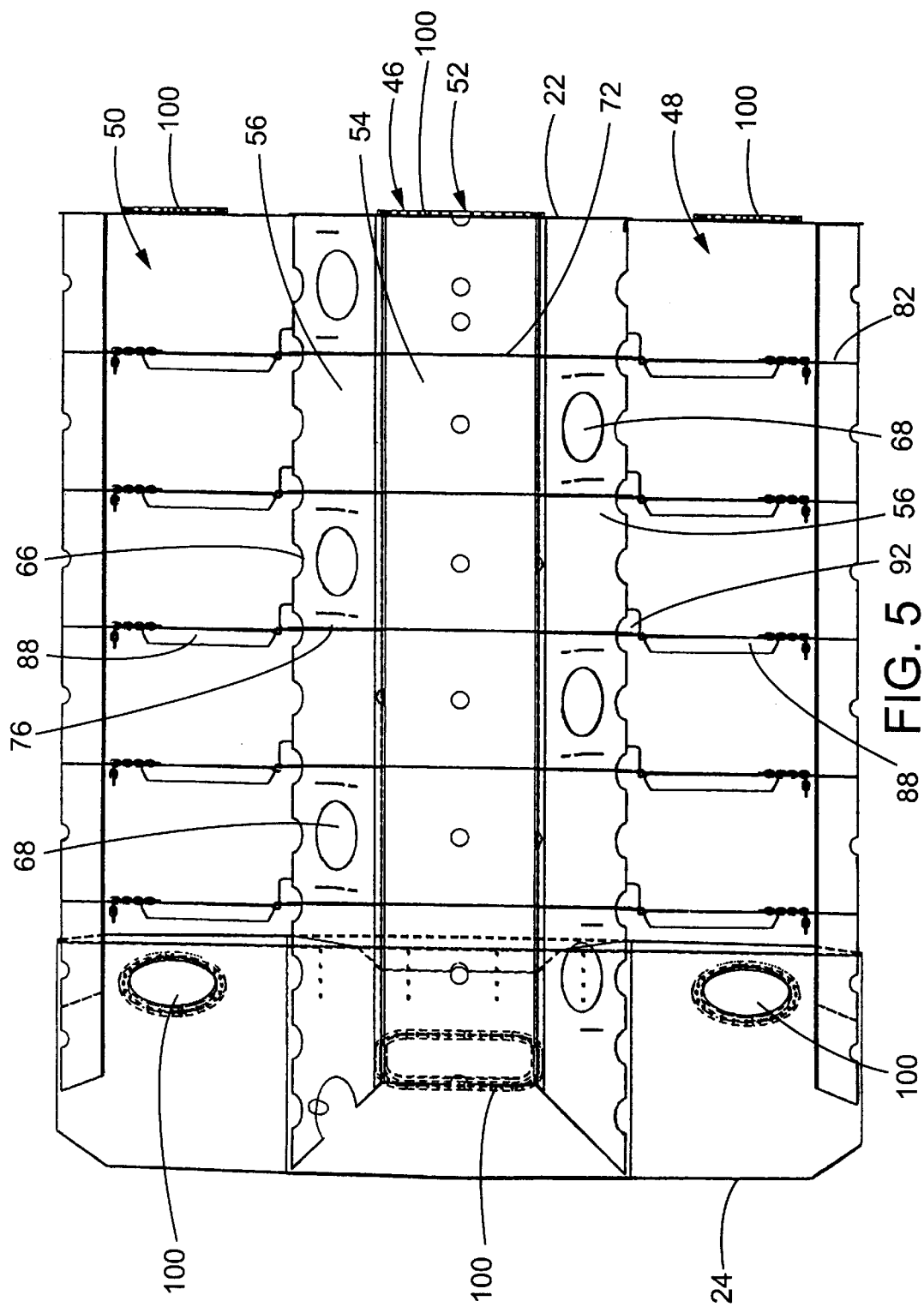
FIG. 5 is a top plan view of the assembled internal baffle system of the tank of FIG. 1.

As shown in FIGS. 5 and 9, a plurality of holes 64 are provided in the upper and lower walls 60, 62 (best shown in FIGS. 4, 6 and 8) of the rectangular chamber 54 to allow fluid to work its way downward in the tank 12 during filling or emptying of the tank. Similarly, holes 66 are provided along the upper edges of the upper legs 56 and the lower edges of the lower legs 58, as shown in FIG. 7, to assist fluid in migrating through the entire tank 12.

To assist fluid migration and also provide access for workers performing maintenance operations, openings 68 are provided, in this instance, in the middle of upper and lower legs 56, 58 of the X-shaped longitudinal baffle arrangement 52 as shown in FIGS. 3–5 and 7. During normal operations of the tank 12, some or all of these openings 68 can be closed with loose fitting hatch plates to prevent the lateral surging of the fluid in the tank. In this case, the hatch plates are received in slots which are arranged on either side of the openings 68 as shown, for example, in FIGS. 5 and 7. When work is being performed on the interior of the tank 12, the loose hatch plates can be removed to provide access to the interior of the upper and lower portions of the longitudinal X-shaped baffle arrangement 52.

For limiting longitudinal wave action and surging of fluid such as during braking or acceleration of the tanker truck 10, vertically extending baffles are arranged between the legs of the X-shaped baffle arrangement 52. As shown in FIGS. 6–8 and 10, an upper lateral baffle 72 is provided between the upper legs 56 and a lower lateral baffle 74 between the lower legs 58 at spaced intervals along the length of the X-shaped baffle arrangement 52. Additionally, side lateral baffles 76 are provided to either side of the X-shaped arrangement 52 at spaced intervals along the length thereof. Again, because, in this case, the tank 12 gets deeper as it extends from its rear wall 22 to its front wall 24, these side lateral baffles 76 to the sides of the X-shaped baffle arrangement 52 get larger towards the front of the tank 12 This can be seen via broken lines in the rear end views of FIGS. 6 and 10. Access openings 78 are provided in each of the upper and lower lateral baffles 72, 74 to provide access into the compartments formed in the upper and lower portions of the X-shaped baffle arrangement 52 by the lateral baffles. Similar to the access openings 68 in the legs 56, 58 of the X-shaped baffle arrangement 52, the access openings 78 in the upper and lower lateral baffles 72, 74 can be closed by loose fitting hatch plates that are received in slots to either side of each opening 78 (see, e.g., FIG. 8 in which exemplary slots are shown for the upper access opening 78). Moreover, at least one of the access openings 68 in the legs 56, 58 of the X-shaped baffle arrangement is arranged between each pair of upper and lower lateral baffles 72, 74 and side lateral baffles 76 to allow access into each compartment created by the upper and lower lateral baffles and side lateral baffles 76.

Additional lateral baffling can also be provided to either side of the center section 46 in the left and right side sections 48, 50. As shown in FIGS. 11–14 (left section 48) and FIGS. 15–18 (right section 50), with the exception of certain accessory type components such as the fill hole 38 and the ventilation chamber 40, the left and right sections 48, 50 are mirror images of each other. Each side section 48, 50 includes a plurality of longitudinally spaced C-shaped ribs 82 as best shown in FIGS. 11, 13, 15 and 17. These C-shaped ribs 82 extend around the interior surface of each side section 48, 50 (see, e.g., FIGS. 14 and 18) to support the sidewalls 20 of the tank 12 as well as the portions of the floor 26 and top wall 25 of the tank defined by the side sections. Additional support for the sidewalls 20 of the tank 12 is provided, in this case, by reinforcing plates 84 which extend longitudinally between the ribs 82 on the side of each side section 48, 50. In the illustrated embodiment, each side section 48, 50 includes parallel upper and lower sets of reinforcing plates 84 as shown in FIGS. 11, 13, 15 and 17. These reinforcing plates 84 also serve to disrupt side-to-side liquid surging.

Figure 21:
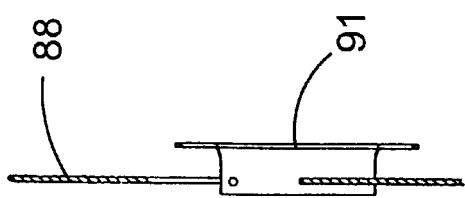
FIG. 21 is a sectional view taken in the plane of line 21—21 in FIG. 19 showing an exemplary cover plate installed over the access opening in the hinged baffle door.
Figure 19:
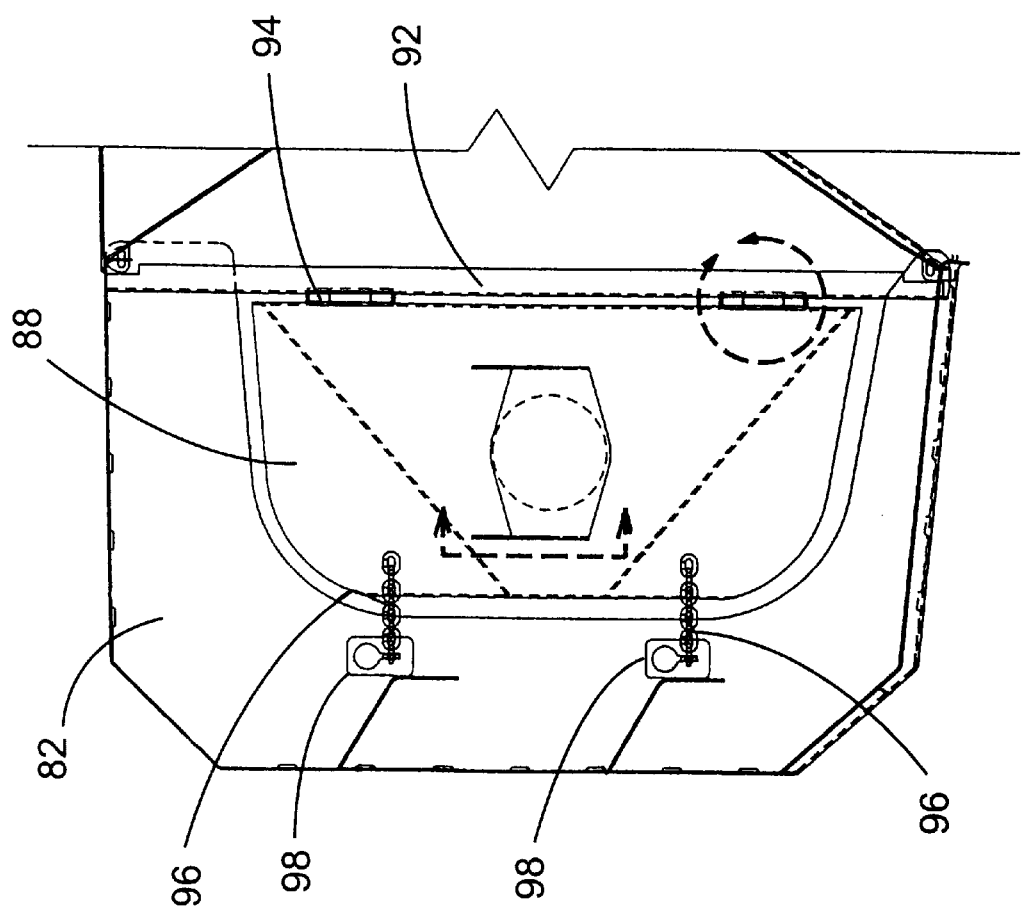
FIG. 19 is a rear elevation view of one of the hinged baffles of the tank of FIG. 1.
Figure 22:
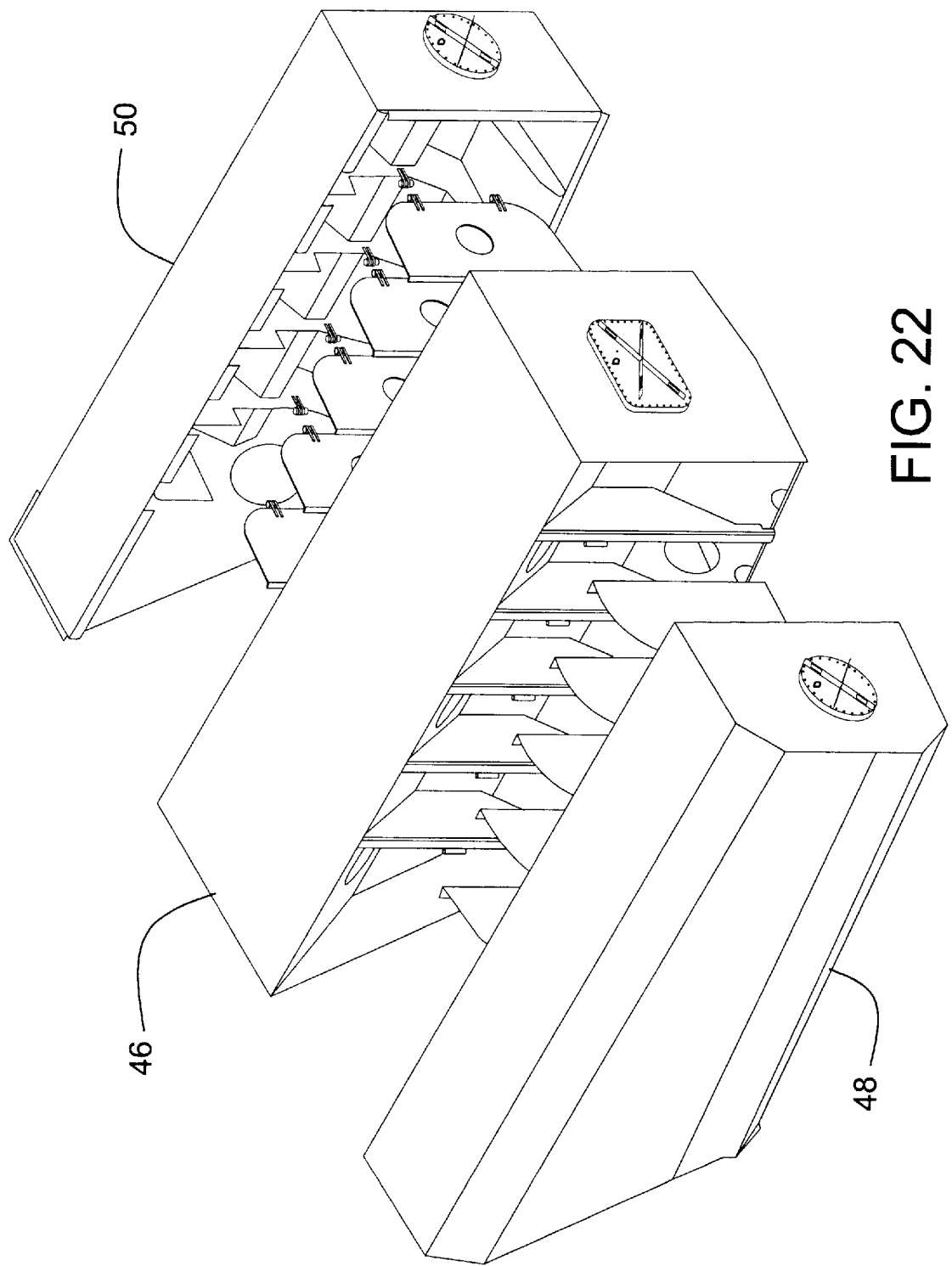
FIG. 22 is an exploded perspective view of the tank of FIG. 1.

Lateral baffle doors 88 are provided in each side section 48, 50 that extend between the C-shaped ribs 82 and the center X-shaped baffle arrangement 52 as shown, for example, in FIG. 3. In order to provide workers with substantially unobstructed access to the interior of the side sections 48, 50 of the tank 12, these lateral baffle doors 88 are pivotally supported or hinged such that they can be swung into an open position in which they extend longitudinally with respect to the tank 12. When the pivotal or hinged baffle doors 88 are in this open position, the side sections 48, 50 are substantially open from end-to-end. Again, in the illustrated embodiment, an access opening 90 is provided in each of the hinged baffle doors 88 which can be closed by a loose fitting hatch plate 91 (see, e.g., FIGS. 19 and 21). As will be appreciated, a hatch plate such as shown in FIGS. 19 and 21 could also be used to close any of the other access openings provided in the other baffles.

Figure 20:
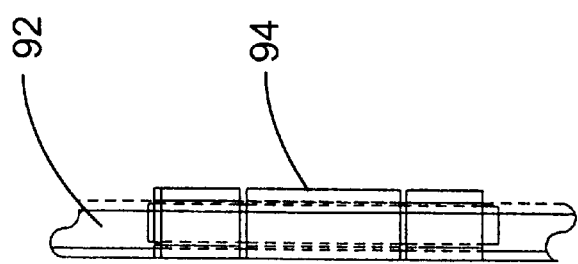
FIG. 20 is an enlarged rear elevation view of one of the hinges of the hinged baffle of FIG. 19.

For supporting the hinged baffle doors 88, a plurality of longitudinally spaced upright support members 92 that extend between the floor 26 and top wall 25 of the tank are provided on either side of the center section 46 as shown in FIGS. 5 and 7. Hinges 94 are provided on each the upright support members 92 (see FIGS. 19 and 20) for pivotally supporting one edge of a respective hinged baffle door 88. In the illustrated embodiment, the other end of each hinged baffle door 88 can be secured in a closed, deployed position by a pair of chains 96 that are captured in corresponding keyways 98 in the C-shaped ribs 82 as shown in FIG. 19. In the closed, deployed position, the hinged baffle doors 88 are substantially aligned with the lateral baffles 72, 74, 76 that extend between the legs 56, 58 of the center X-shaped baffle arrangement 52 as shown in FIGS. 3, 5 and 6.

The hinged baffle doors 88 allow the side sections 48, 50 to be constructed in a manner similar to the hull of a ship with the C-shaped ribs 82 supporting the walls of the tank 12. However, the C-shaped ribs 82 also form part of the lateral baffling in the tank 12 when the hinged baffle doors 88 are closed. Thus, the illustrated baffling configuration also allows the structural components of the side sections of the tank 12 to also serve as baffles. Alternatively, the C-shaped ribs 82 could be arranged on the exterior surface of the tank 12 with the hinged baffle doors 88 being latched directly to the inside surface of the sidewalls 20. Attaching the hinged baffle doors 88 to the center section 46 can also permit the left and right side sections 48, 50 to be interlocked for shipment on a single truck. The center section 46 then can be shipped separately with the hinged baffle doors 88 swung into the longitudinally extending open position against the outside of the X-shaped baffle arrangement 52.

Figure 11:
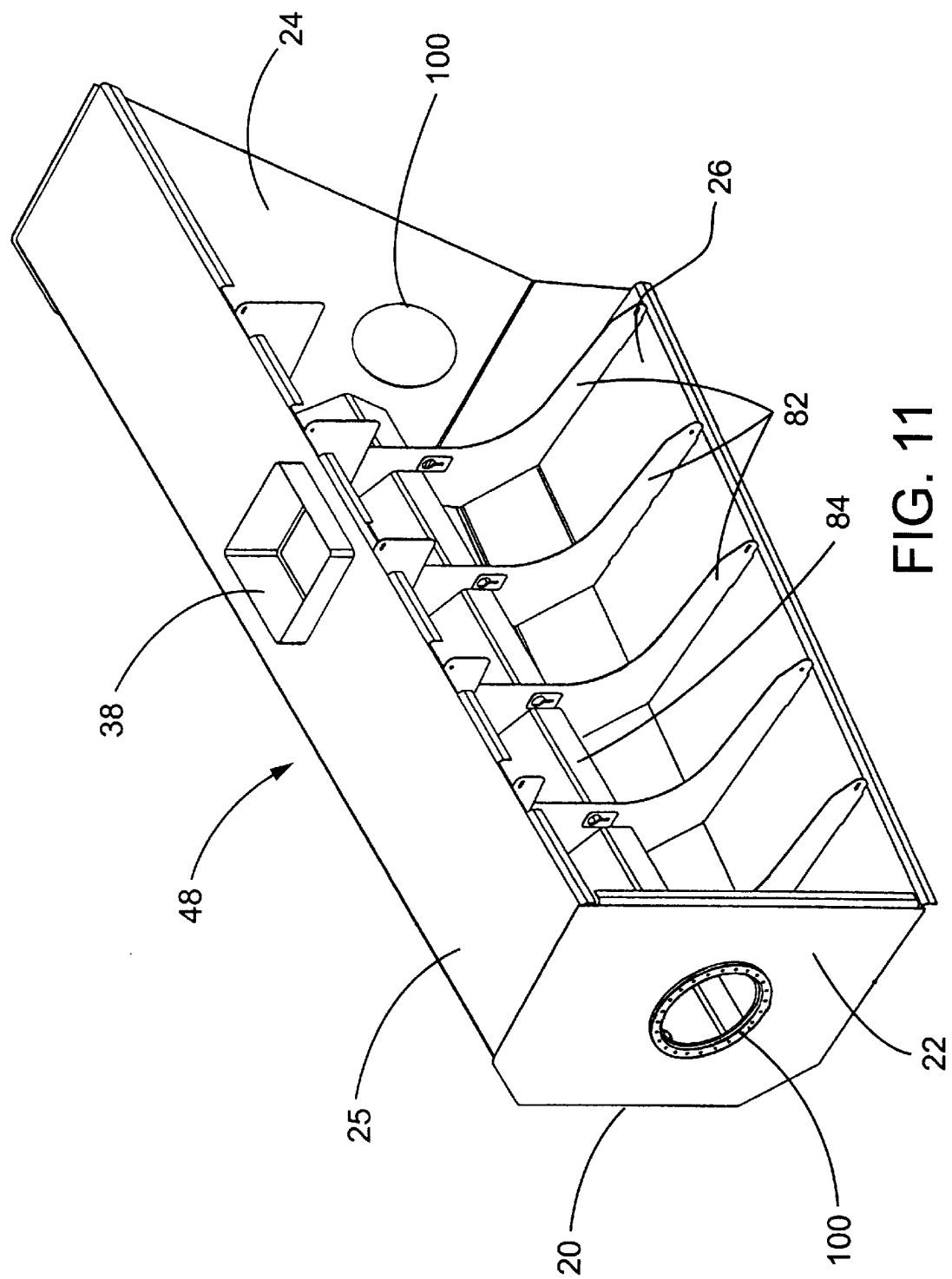
FIG. 11 is a perspective view of the left side section of the tank of FIG. 1.
Figure 12:
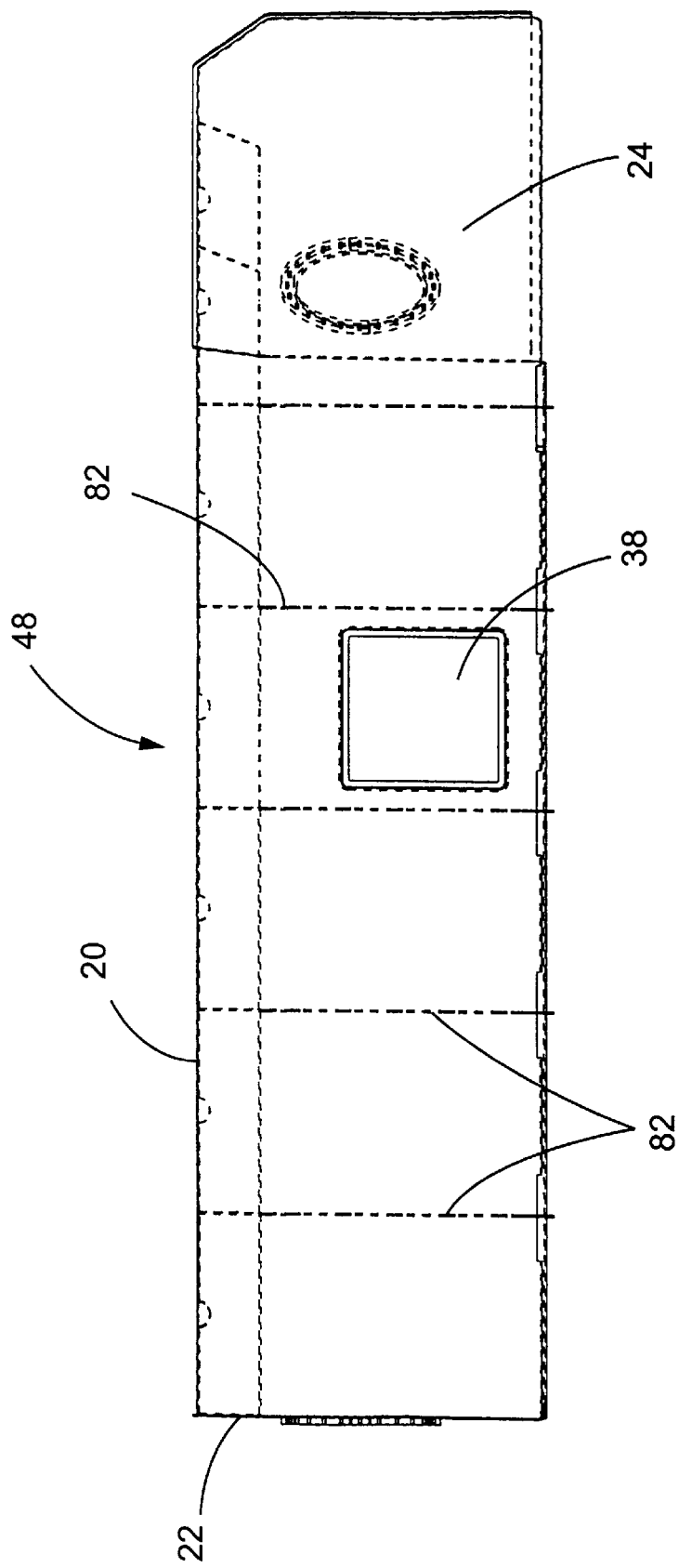
FIG. 12 is a top plan view of the left side section of the tank of FIG. 1.
Figure 13:
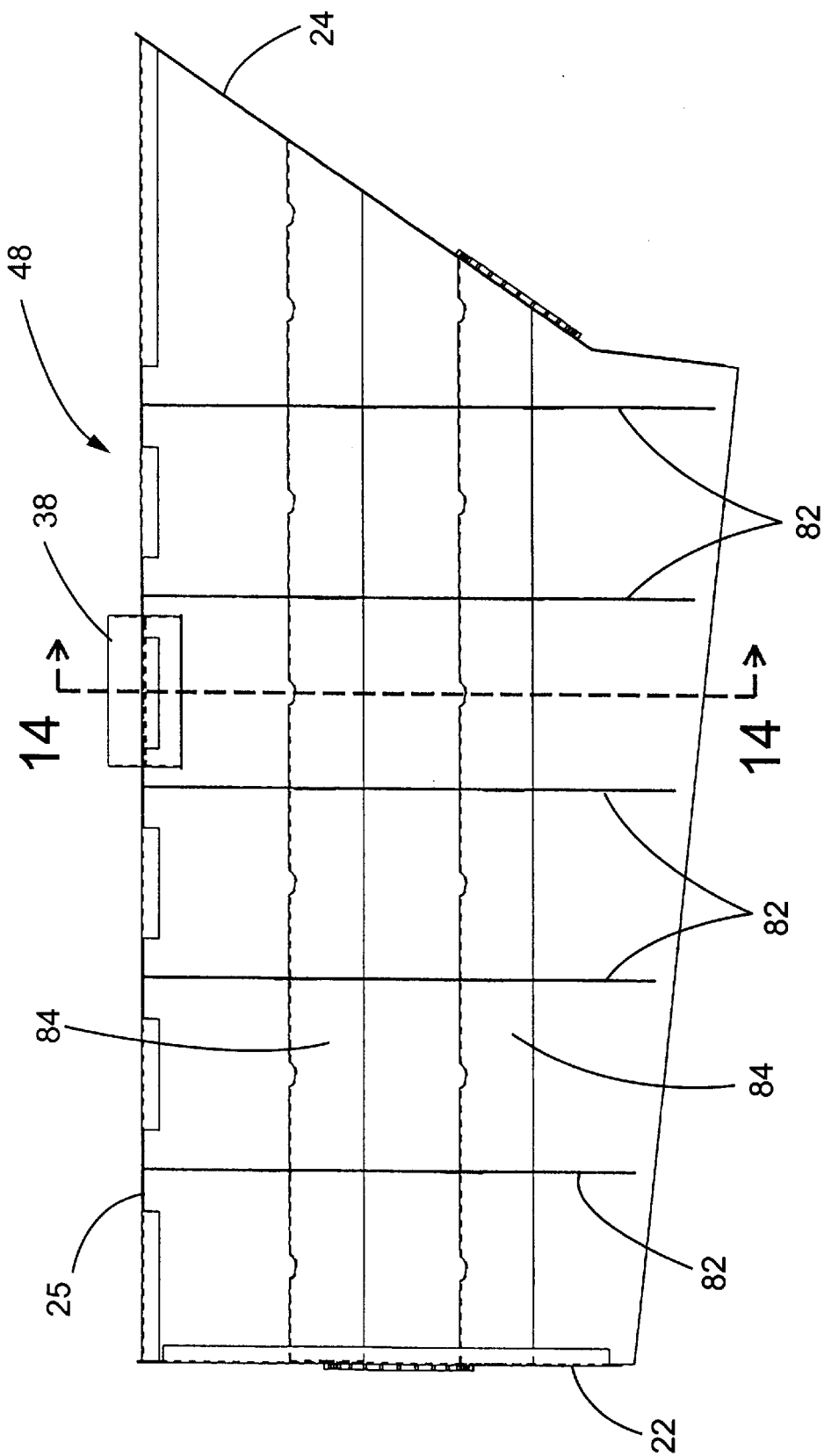
FIG. 13 is a side elevation view of the left side section of the tank of FIG. 1 looking from the inside of the center section of the tank.
Figure 14:
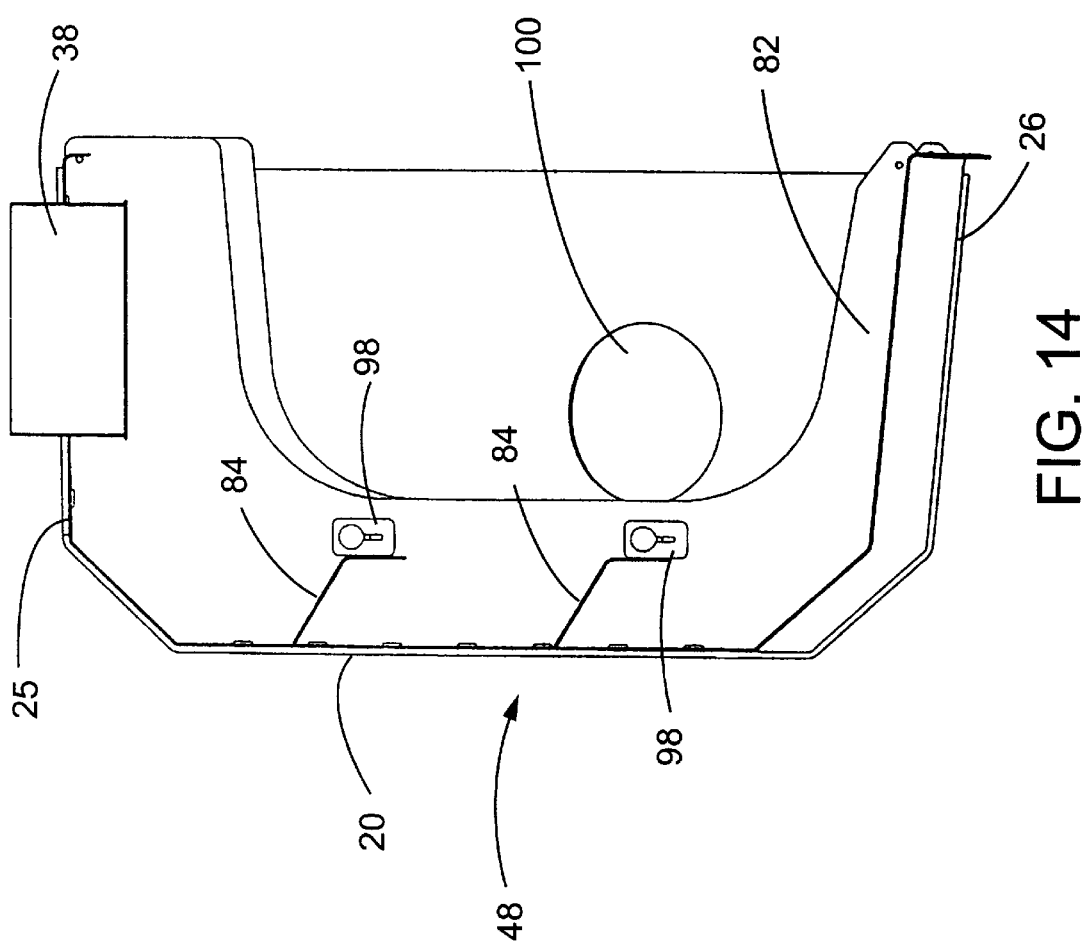
FIG. 14 is a sectional view taken in the plane of line 14—14 in FIG. 13 of the left side section of the tank of FIG. 1.
Figure 15:
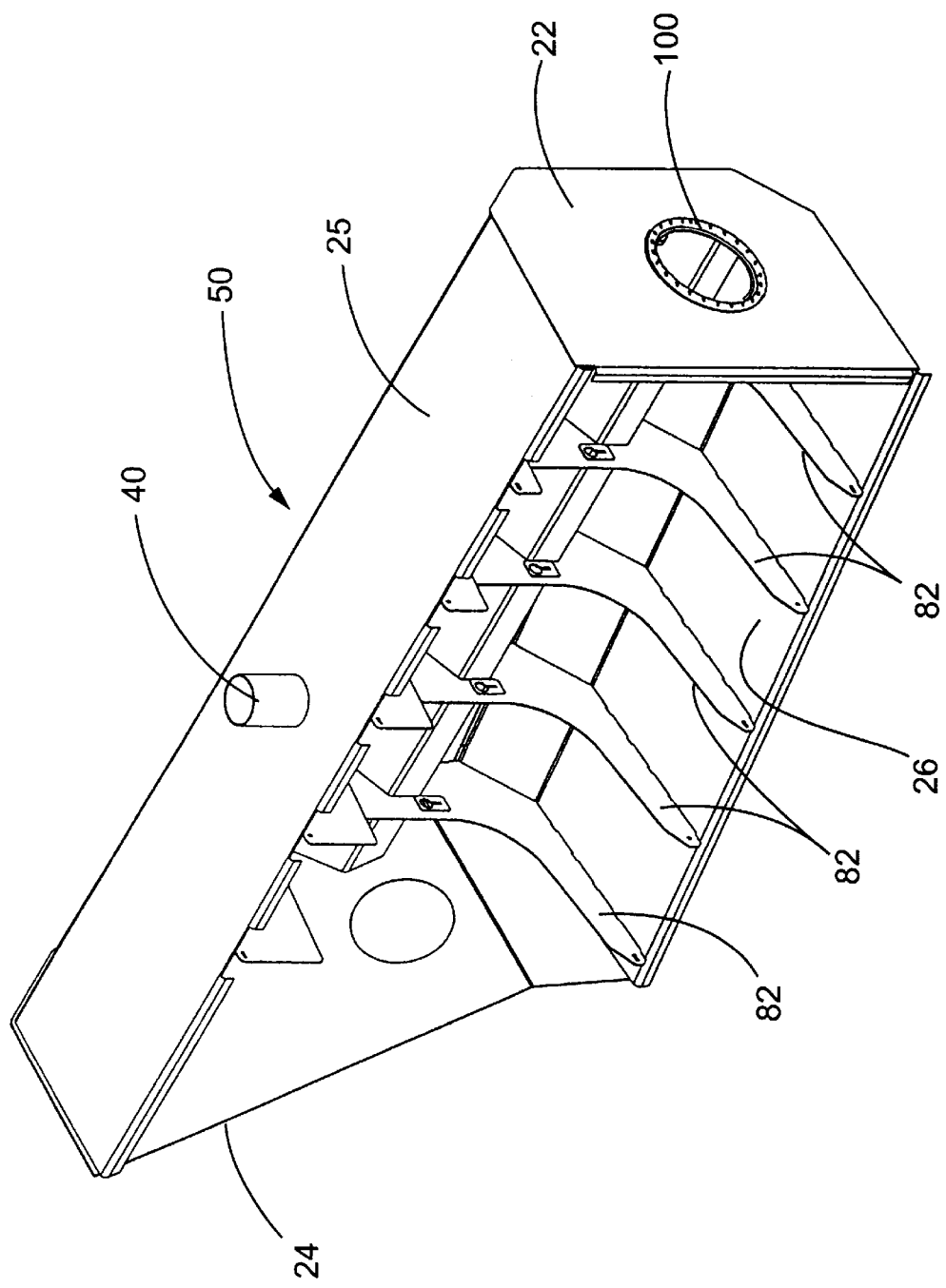
FIG. 15 is a perspective view of the right side section of the tank of FIG. 1.
Figure 16:
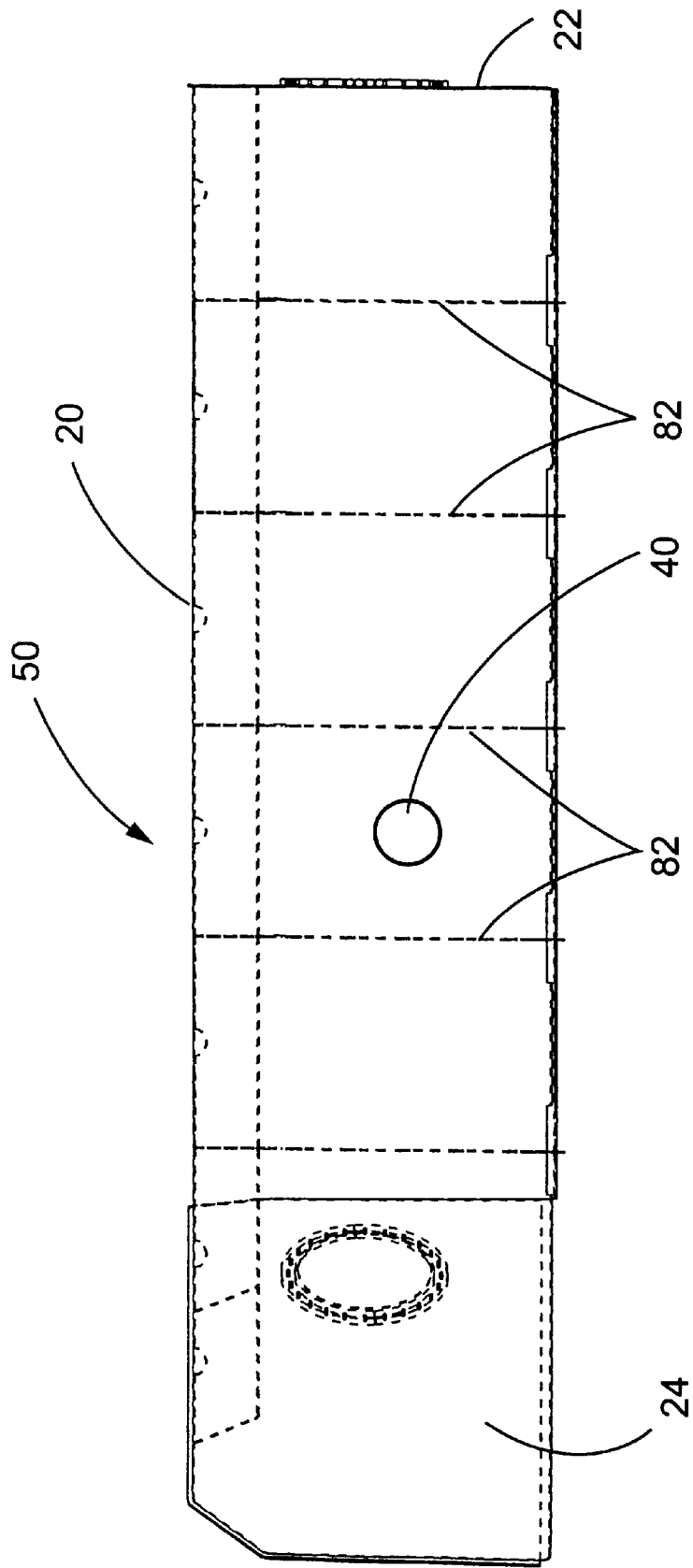
FIG. 16 is a top plan view of the right side section of the tank of FIG. 1.
Figure 17:
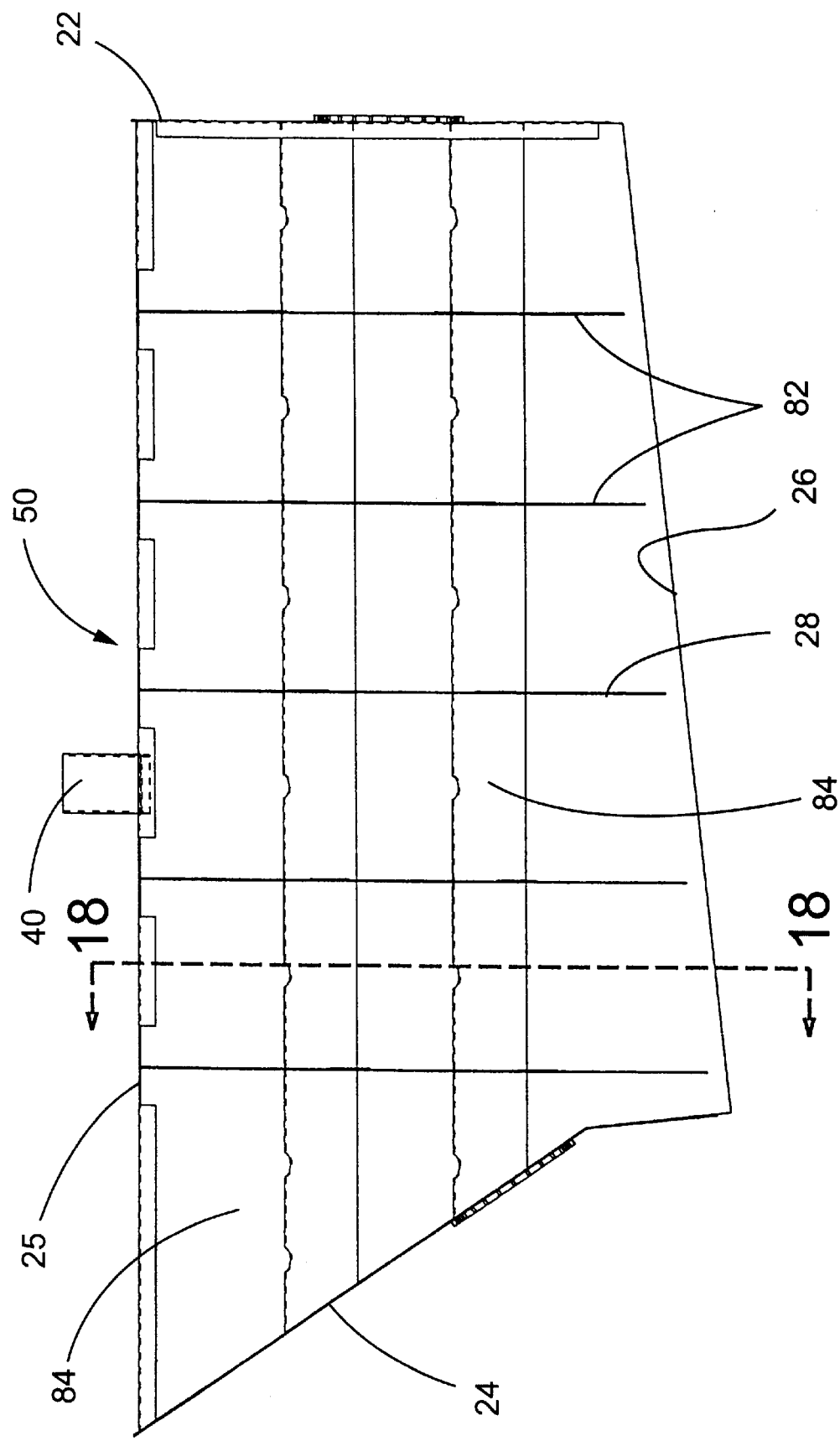
FIG. 17 is a side elevation view of the right side section of the tank of FIG. 1 looking from the inside of the center section of the tank.
Figure 18:
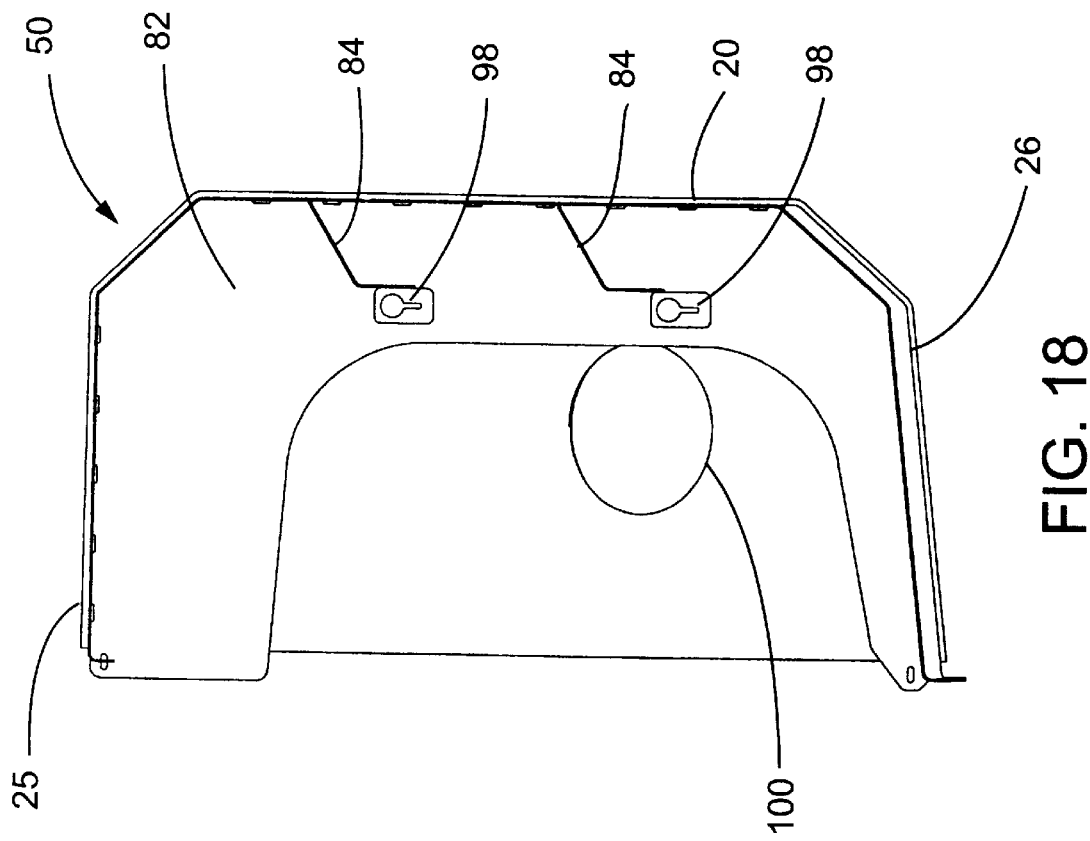
FIG. 18 is a sectional view taken in the plane of line 18—18 in FIG. 17 of the right side section of the tank of FIG. 1.

According to a further aspect of the present invention, to relieve concerns regarding working in a confined space and thereby eliminate the necessity for an external secondary air supply, the tank 12 can include entry hatches 100 in the sides and/or ends of the tank. In this instance, an entry hatch 100 is provided in both the front wall 24 and rear wall 22 of the tank 12 for each of the tank sections 46, 48, 50. In particular, as best shown in FIGS. 9 and 10, an entry hatch 100 is provided at either end of the center section 46. Similarly, as shown in FIGS. 11 and 15, entry hatches 100 are provided in either end of both side sections 48, 50. These entry hatches 100 can be closed by corresponding hatch plates 102 such as shown in FIG. 2.

When work must be performed inside the tank, the hatches 100 can be opened to provide light and air into the interior of the tank. By swinging the hinged baffle doors 88 into their open positions and removing the loose fitting hatch plates on the access openings in the various baffles, all of the compartments inside the tank 12 can be easily accessed thereby eliminating confined space concerns. Moreover, with the hinged baffle doors 88 in the open position, workers can see and walk from one end of the tank 12 to the other substantially unobstructed. If sized appropriately, the entry hatches 100 can also allow the hinged baffle doors 88 or other internal baffle structures to be inserted into or removed from the interior of the tank after the components are assembled together.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Of course, variations of those preferred embodiments will become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A tank for transporting liquids, comprising:
   a tank vessel having front and rear walls defining a longitudinal direction, opposing sidewalls defining a lateral direction and a floor and a top,
   a X-shaped baffle arrangement extending through the interior of the tank vessel in the longitudinal direction, the X-shaped baffle arrangement having a longitudinally extending chamber in the center thereof and having two upper legs extending between the chamber and the top of the tank vessel and two lower legs extending between the chamber and the floor of the tank vessel, and
   a plurality of longitudinally spaced pivotal baffles extending from either side of X-shaped baffle arrangement towards a respective one of the sidewalls, each pivotal baffle being supported for pivotal movement on the X-shaped baffle arrangement between an open position wherein the pivotal baffle extends in the longitudinal direction and a closed position wherein the pivotal baffle extends in the lateral direction.

2. The tank according to claim 1 further including a plurality of longitudinally spaced C-shaped rib baffles extending in a lateral direction, each C-shaped rib being carried on a respective one of the sidewalls of the tank vessel and a portion of the top and floor of the tank vessel to provide support therefor.

3. The tank according to claim 2 wherein each C-shaped rib is aligned with a respective pivotal baffle such that the C-shaped rib extends between the respective sidewall of the tank vessel and an outside edge of the pivotal baffle.

4. The tank according to claim 3 wherein each pivotal baffle can be secured in the closed position by a connecting element to its respective C-shaped rib.

5. The tank according to claim 1 wherein each pivotal baffle has an access opening extending therethrough.

6. The tank according to claim 5 wherein the access opening in each pivotal baffle has an associated hatch plate which is movable between open and closed positions.

7. The tank according to claim 1 wherein each of the upper legs and each of the lower legs of the X-shaped baffle arrangement has at least one access opening extending therethrough.

8. The tank according to claim 7 wherein the access opening in each of the upper and lower legs has an associated hatch plate which is movable between open and closed positions.

9. The tank according to claim further including a plurality of upper lateral baffles being arranged between the upper legs of the X-shaped baffle arrangement and a plurality of lower lateral baffles being arranged between the lower legs of the X-shaped baffle arrangement.

10. The tank according to claim 9 wherein each of the upper lateral baffles and each of the lower lateral baffles has an access opening extending therethrough.

11. The tank according to claim 10 wherein the access opening in each upper lateral baffle and each lower lateral baffle has an associated hatch plate which is movable between open and closed positions.

12. The tank according to claim 9 wherein the upper legs have a plurality of access openings extending therethrough with at least one access opening being arranged between each pair of upper lateral baffles.

13. The tank according to claim 9 wherein the lower legs have a plurality of access openings extending therethrough with at least one access opening being arranged between each pair of lower lateral baffles.

14. The tank according to claim 1 further including a plurality of side lateral baffles extending from either side of the X-shaped baffle arrangement, each side lateral baffle being arranged between a respective one of the upper legs and a respective one of the lower legs and being aligned with a respective one of the pivotal baffles.

15. The tank according to claim 14 wherein the upper legs have a plurality of access openings extending therethrough and the lower legs have a plurality of access openings extending therethrough with at least one access opening being arranged between each pair of side lateral baffles.

16. The tank according to claim 14 wherein each of the pivotal baffles is pivotally connected by a hinge to an upright support member extending between the floor and top of the tank vessel at an end of a respective one of the side lateral baffles.

17. The tank according to claim 1 wherein the tank vessel has a plurality of entry hatches therein for permitting access into the interior of the tank vessel, each entry hatch having an associated hatch plate which is movable between open and closed positions and being sized to allow a person to enter the tank therethrough.

18. The tank according to claim 17 wherein at least one entry hatch is arranged in the front wall of the tank vessel and at least one entry hatch is arranged in the rear wall of the tank vessel.

19. The tank according to claim 17 wherein a first entry hatch is arranged in one of the opposing sidewalls, rear wall or front wall of the tank vessel and a second entry hatch is arranged in a different one of the opposing side walls, rear wall or front wall of the tank vessel than the first entry hatch.

20. The tank according to claim 1 wherein the tank vessel has a three-piece construction comprising a center section and two side sections, the X-shaped baffle arrangement being arranged in the center section of the tank with at least one pivotal baffle extending to either side thereof, the side sections being assembled to either side of the center section to form the tank vessel with each pivotal baffle extending into a respective one of the side sections when the pivotal baffle is in the closed position.

21. The tank according to claim 20 wherein the center section and each of the side sections has a plurality of entry hatches therein for permitting access into the interior of the tank vessel, each entry hatch having an associated hatch plate which is movable between open and closed positions and being sized to allow a person to enter the tank therethrough.

22. A tank for transporting liquids, comprising:
    a tank vessel having front and rear walls defining a longitudinal direction, opposing sidewalls defining a lateral direction and a floor and a top,
    a longitudinal baffle arrangement extending in the longitudinal direction through the tank vessel, the longitudinal baffle arrangement including a longitudinally extending chamber, and
    a pivotal baffle supported on the longitudinal baffle arrangement for pivotal movement between an open position wherein the pivotal baffle extends in the longitudinal direction and a closed position wherein the pivotal baffle extends in the lateral direction.

23. The tank according to claim 22 wherein the tank includes a plurality of longitudinally spaced pivotal baffles.

24. The tank according to claim 23 further including a plurality of lateral baffles supported on the longitudinal baffle arrangement, each lateral baffle being aligned with a respective one of the pivotal baffles.

25. The tank according to claim 24 wherein each of the pivotal baffles is pivotally connected by a hinge to an upright support member extending between the floor and top of the tank vessel at an end of a respective one of the lateral baffles.

26. The tank according to claim 23 wherein the tank vessel has a three-piece construction comprising a center section and two side sections, the longitudinal baffle arrangement being arranged in the center section of the tank with at least one pivotal baffle extending from either side thereof, the side sections being assembled to either side of the center section to form the tank vessel with each pivotal baffle extending into a respective one of the side sections.

27. The tank according to claim 26 wherein the center section and each the side sections has a plurality of entry hatches therein for permitting access into the interior of the tank vessel, each entry hatch having an associated hatch plate which is movable between open and closed positions and being sized to allow a person to enter the tank therethrough.

28. The tank according to claim 23 further including a plurality of longitudinally spaced C-shaped rib baffles extending in a lateral direction, each C-shaped rib being carried on a respective one of the sidewalls of the tank vessel and a portion of the top and floor of the tank vessel to provide support therefor.

29. The tank according to claim 28 wherein each C-shaped rib is aligned with a respective pivotal baffle such that the C-shaped rib extends between the respective sidewall of the tank vessel and an outside edge of the pivotal baffle.

30. The tank according to claim 29 wherein each pivotal baffle can be secured in the closed position by a connecting element to its respective C-shaped rib.

31. The tank according to claim 22 wherein the pivotal baffle has an access opening extending therethrough.

32. The tank according to claim 31 wherein the access opening in the pivotal baffle has an associated hatch plate which is movable between open and closed positions.

33. The tank according to claim 22 wherein the longitudinal baffle arrangement includes at least one longitudinal baffle which is attached to the longitudinally extending chamber.

34. The tank according to claim 33 wherein the at least one longitudinal baffle has at least one access opening extending therethrough.

35. The tank according to claim 34 wherein the access opening in the longitudinal baffle has an associated hatch plate which is movable between open and closed positions.

36. The tank according to claim 22 wherein the tank vessel has a plurality of entry hatches therein for permitting access into the interior of the tank vessel, each entry hatch having an associated hatch plate which is movable between open and closed positions and being sized to allow a person to enter the tank therethrough.

37. The tank according to claim 36 wherein at least one entry hatch is arranged in the front wall of the tank vessel and at least one entry hatch is arranged in the rear wall of the tank vessel.

38. The tank according to claim 36 wherein a first entry hatch is arranged in one of the opposing sidewalls, rear wall or front wall of the tank vessel and a second entry hatch is arranged in a different one of the opposing side walls, rear wall or front wall of the tank vessel than the first entry hatch.

39. A tank for transporting liquids, comprising:
    a tank vessel having front and rear walls defining a longitudinal direction, opposing sidewalls defining a lateral direction and a floor and a top, and
    a baffle arrangement extending through the interior of the tank vessel in the longitudinal direction, the baffle arrangement having a longitudinally extending chamber and having two upper legs extending between the chamber and the top of the tank vessel and two lower legs extending between the chamber and the floor of the tank vessel, such that the baffle arrangement provides structural support for the top and the floor of the tank vessel.

40. The tank according to claim 39 wherein the baffle arrangement has a generally X-shaped configuration with the longitudinally extending chamber being in the center thereof.

41. The tank according to claim 39 wherein each of the upper legs and each of the lower legs of the baffle arrangement has at least one access opening extending therethrough.

42. The tank according to claim 41 wherein the access opening in each of the upper and lower legs has an associated hatch plate which is movable between open and closed positions.

43. The tank according to claim 39 further including a plurality of upper lateral baffles being arranged between the upper legs of the baffle arrangement and a plurality of lower lateral baffles being arranged between the lower legs of the baffle arrangement.

44. The tank according to claim 43 wherein each of the upper lateral baffles and each of the lower lateral baffles has an access opening extending therethrough.

45. The tank according to claim 44 wherein the access opening in each upper lateral baffle and each lower lateral baffle has an associated hatch plate which is movable between open and closed positions.

46. The tank according to claim 43 wherein the upper legs have a plurality of access openings extending therethrough with at least one access opening being arranged between each pair of upper lateral baffles.

47. The tank according to claim 43 wherein the lower legs have a plurality of access openings extending therethrough with at least one access opening being arranged between each pair of lower lateral baffles.

48. The tank according to claim 39 further including a plurality of side lateral baffles extending from either side of the baffle arrangement.

49. The tank according to claim 48 wherein the upper legs have a plurality of access openings extending therethrough and the lower legs have a plurality of access openings extending therethrough with at least one access opening being arranged between each pair of side lateral baffles.

50. The tank according to claim 39 wherein the tank vessel has a plurality of entry hatches therein for permitting access into the interior of the tank vessel, each entry hatch having an associated hatch plate which is movable between open and closed positions and being sized to allow a person to enter the tank therethrough.

51. The tank according to claim 50 wherein at least one entry hatch is arranged in the front wall of the tank vessel and at least one entry hatch is arranged in the rear wall of the tank vessel.

52. The tank according to claim 50 wherein a first entry hatch is arranged in one of the opposing sidewalls, rear wall or front wall of the tank vessel and a second entry hatch is arranged in a different one of the opposing side walls, rear wall or front wall of the tank vessel than the first entry hatch.

53. The tank according to claim 39 further including a pivotal baffle supported on the baffle arrangement for pivotal movement between an open position wherein the pivotal baffle extends in the longitudinal direction and a closed position wherein the pivotal baffle extends in the lateral direction.

54. The tank according to claim 53 wherein the tank includes a plurality of pivotal baffles.

55. The tank according to claim 54 wherein the tank vessel has a three-piece construction comprising a center section and two side sections, the baffle arrangement being arranged in the center section of the tank with at least one pivotal baffle extending to either side thereof, the side sections being assembled to either side of the center section to form the tank vessel with each pivotal baffle extending into a respective one of the side sections when the pivotal baffle is in the closed position.

56. The tank according to claim 55 wherein the center section and each of the side sections has a plurality of entry hatches therein for permitting access into the interior of the tank vessel, each entry hatch having an associated hatch plate which is movable between open and closed positions and being sized to allow a person to enter the tank therethrough.

57. A tank for transporting liquids, comprising a tank vessel having front and rear walls defining a longitudinal direction, opposing sidewalls defining a lateral direction and a floor and a top, a plurality of baffles extending in the longitudinal direction in the interior of the tank vessel, a plurality of baffles extending in the lateral direction in the interior of the tank vessel, a fill hole being provided in the tank vessel for filling the tank with fluid, and a plurality of entry hatches in the tank vessel for permitting access into the interior of the tank vessel, each entry hatch having an associated hatch plate which is movable between open and closed positions and being sized to allow a person to enter the tank therethrough, the plurality of entry hatches including a first entry hatch arranged in one of the opposing sidewalls, rear wall or front wall of the tank vessel and a second entry hatch arranged in a different one of the opposing side walls, rear wall or front wall of the tank vessel than the first entry hatch, wherein at least selected ones of the baffles have an access opening therethrough, each access opening having an associated hatch plate which is movable between open and closed positions, the access openings being provided in the baffles such that when the hatch plates are in the open position a person can traverse through the interior of the tank between the first and second entry hatches.

58. The tank according to claim 57 wherein the tank vessel has a three-piece construction comprising a center section and two side sections, a central baffle arrangement being arranged in the center section of the tank and two side baffle arrangements being carried on opposing sides of the center section of the tank, the two side sections being assembled to either side of the center section to form the tank vessel with each side baffle arrangement extending into a respective one of the side sections of the tank.

59. The tank according to claim 58 wherein the center section and each the side sections has a plurality of entry hatches therein for permitting access into the interior of the tank vessel, each entry hatch having an associated hatch plate which is movable between open and closed positions and being sized to allow a person to enter the tank therethrough.

60. The tank according to claim 57 wherein at least one of the lateral baffles is supported for pivotal movement.

61. The tank according to claim 57 wherein at least one entry hatch is arranged in the front wall of the tank vessel and at least one entry hatch is arranged in the rear wall of the tank vessel.

62. The tank according to claim 57 wherein each of the lateral baffles has an access opening extending therethrough and an associated hatch plate which is movable between open and closed positions.

63. A tank for transporting liquids, comprising:
- a tank vessel having front and rear walls defining a longitudinal direction, opposing sidewalls defining a lateral direction and a floor and a top, and
- a center baffle arrangement extending through the interior of the tank vessel in the longitudinal direction, the baffle arrangement having a longitudinally extending chamber and having two upper legs extending between the chamber and the top of the tank vessel and two lower legs extending between the chamber and the floor of the tank vessel, and
- a plurality of longitudinally spaced side baffles extending from either side of the center baffle arrangement towards a respective one of the sidewalls, each of the side baffles having an access opening extending therethrough and an associated hatch plate which is movable between open and closed positions.

64. The tank according to claim 63 further including a plurality of upper lateral baffles being arranged between the upper legs of the center baffle arrangement and a plurality of lower lateral baffles being arranged between the lower legs of the center baffle arrangement.

65. The tank according to claim 63 wherein the tank vessel has a plurality of entry hatches therein for permitting access into the interior of the tank vessel, each entry hatch having an associated hatch plate which is movable between open and closed positions and being sized to allow a person to enter the tank therethrough.

66. The tank according to claim 65 wherein at least one entry hatch is arranged in the front wall of the tank vessel and at least one entry hatch is arranged in the rear wall of the tank vessel.

67. The tank according to claim 65 wherein a first entry hatch is arranged in one of the opposing sidewalls, rear wall or front wall of the tank vessel and a second entry hatch is arranged in a different one of the opposing side walls, rear wall or front wall of the tank vessel than the first entry hatch.

\* \* \* \* \*

UNITED STATES PATENT AND TRADEMARK OFFICE
CERTIFICATE OF CORRECTION

PATENT NO.   : 6,547,091 B2
DATED        : April 15, 2003
INVENTOR(S)  : LeRoy G. Hagenbuch It is certified that error appears in the above-identified patent and that said Letters Patent is hereby corrected as shown below:

<u>Title page,</u>
Item [56], References Cited, please add the following:

-- U.S. PATENT DOCUMENTS

| | | |
|---|---|---|
| 4,251,005 | Sons et al. | 02/1981 |
| 4,313,566 | Klein | 02/1982 |
| 5,779,092 | Hehn et al. | 07/1998 |

OTHER PUBLICATIONS

Payhauler Corp.; 350C Tanker Product Guide. Copyright 1995.
Magnum Australia; Magnum Water Tanks and Related Spray Equipment Product Guide from www.magnumaustralia.com. Copyright 1998-2000.
Rimpull Corporation; WT-2749 Water Truck Product Guide. Copyright 1999.
Klein Products Inc.; Product Guide. Copyright 1999.
Photographs (twelve) of Water Tank Manufactured by MegaCorp. Taken October 19, 2000.
Photographs (ten) of Tanker Truck manufactured by Klein Products, Inc. Taken on October 19, 2000.
Rosco Manufacturing Company; DS Water Truck Product Guide from www.roscomfg.com. Copyright 2000.
Klein Products Inc.; Liquid Distributing Equipment Product Guide from www.kleinproducts.com. Copyright 2000.
Rimpull Corporation; Product Guide from www.rimpull.com. Copyright 2000.
Klein Products Inc.; Off-Highway Truck Tanks Product Guide. Copyright 2000.

UNITED STATES PATENT AND TRADEMARK OFFICE
CERTIFICATE OF CORRECTION

PATENT NO.    : 6,547,091 B2
DATED         : April 15, 2003
INVENTOR(S)   : LeRoy G. Hagenbuch It is certified that error appears in the above-identified patent and that said Letters Patent is hereby corrected as shown below:

OTHER PUBLICATIONS, cont'd.
Klein Products Inc.; Porto Tower Model KPT Product Guide. Copyright 2000.
Caterpillar; Custom Products Machine Price List. Bearing an effective date of January 2, 2001.
Hercules Equipment Ltd.; Product Guide from www.hercules-equipment.com. Applicant first became aware of this material on March 26, 2001.
Mega Corporation; Mobile Water Distribution Equipment Product Guide from www.megacorpinc.com. Applicant first became aware of this material on March 26, 2001. --

Signed and Sealed this

Twenty-fifth Day of November, 2003

JAMES E. ROGAN
*Director of the United States Patent and Trademark Office*